(12) United States Patent
Xin

(10) Patent No.: US 7,391,370 B2
(45) Date of Patent: Jun. 24, 2008

(54) METHOD AND APPARATUS FOR ADAPTIVE DIRECTION ESTIMATION OF RADIO WAVES

(75) Inventor: Jingmin Xin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/704,423

(22) Filed: Feb. 9, 2007

(65) Prior Publication Data

US 2007/0139268 A1   Jun. 21, 2007

Related U.S. Application Data

(63) Continuation of application No. PCT/JP2004/011598, filed on Aug. 12, 2004.

(51) Int. Cl.
  *G01S 5/04* (2006.01)
  *G06F 15/00* (2006.01)
  *H03F 1/26* (2006.01)
  *H03H 7/40* (2006.01)

(52) U.S. Cl. .................. 342/432; 702/196; 702/189; 703/2; 375/232

(58) Field of Classification Search ................ 342/357.01–357.17, 432
See application file for complete search history.

(56) References Cited

U.S. PATENT DOCUMENTS

| | | | |
|---|---|---|---|
| 7,068,221 B2 | 6/2006 | Xin | |
| 7,084,812 B2 | 8/2006 | Xin | |
| 7,327,810 B2 * | 2/2008 | Kim et al. | .......... 375/340 |
| 2002/0126045 A1 | 9/2002 | Kishigami et al. | |
| 2003/0112861 A1 * | 6/2003 | Erdogan et al. | .......... 375/232 |
| 2005/0177348 A1 * | 8/2005 | Lu | .......... 702/189 |
| 2005/0177349 A1 * | 8/2005 | Lu | .......... 702/196 |
| 2006/0025973 A1 * | 2/2006 | Kim | .......... 703/2 |

FOREIGN PATENT DOCUMENTS

| | | |
|---|---|---|
| JP | 9-219616 | 8/1997 |
| JP | 2002-243826 | 8/2002 |
| JP | 2004-61467 | 2/2004 |
| JP | 2004-61468 | 2/2004 |

OTHER PUBLICATIONS

International Search Report, dated Sep. 14, 2004 for International Patent Application PCT/JP2004/011598.

(Continued)

*Primary Examiner*—Thomas H. Tarcza
*Assistant Examiner*—Harry Liu
(74) *Attorney, Agent, or Firm*—Katten Muchin Rosenman LLP

(57) ABSTRACT

In an environment of temporally and spatially uncorrelated white additive noise, the direction estimation apparatus for coherent signals calculates (M−1) instantaneous cross-correlations between some array data, and selecting multiple pairs each of which is consisted of p instantaneous correlations from the (M−1) instantaneous cross-correlations to form a Hankel correlation matrix. Next, the apparatus divides that Hankel matrix into an upper submatrix and a lower submatrix and then calculates a linear operator at time n by using the adaptive LMS algorithm with a fixed or time-varying step-size parameter and or using the adaptive NLMS algorithm from the two submatrices. Then a noise subspace is estimated from that linear operator. Finally the directions of incident signals at time n is estimated and tracked by using that noise subspace with Newton approximation.

12 Claims, 15 Drawing Sheets

OTHER PUBLICATIONS

R.O. Schmidt, "Multiple Emitter Location and Signal Parameter Estimation", IEEE Trans. Antenna Propagation, vol. AP-34, No. 3, pp. 276-280 (1986).

J. Shan, et al. "On Spatial Smooting For Direction-Of-Arrival Estimation Of Coherent Signals", IEEE. Accoust, Speech, Signal Processing, vol. ASSP-33, No. 4, pp. 806-811 (1985).

S. U. Pillai, et al. Forward / Backward Spatial Smoothing Techniques For Coherent Signals Identification, IEEE Trans. Acoust., Speech,, Signal, vol. 37, No. 1, pp. 8-15 (1989).

A. Eriksson, "On-Line Subspace Algorithims For Tracking Moving Sources", IEEE Trans. Signal Processing, vol. 42, No. 9, pp. 2319-2330 (1994).

J. Xin, et al. "Directions-Of-Arrival Tracking Of Coherent Cyclostatinary Signals In Array Processing, "IEEE Trans. Fundamentals vol. E86-A, No. 8, pp. 2037-2046 (2003).

J. Xin, et al. Computationally Efficient Subspace-Based Method For Direction-Of-Arrival Estimation Without Eigendecomposition, IEICE Trans, Signal Processing, vol. 52, No. 4, pp. 876-893 (2004).

* cited by examiner

FIG. 5

$$R = \begin{pmatrix}
 & y_1^* & y_2^* & \cdots & y_p^* & y_{p+1}^* & \cdots & y_{L-1}^* & y_L^* & \cdots & y_{M-1}^* & y_M^* \\
y_1 & r_{11} & r_{12} & \cdots & r_{1p} & r_{1,p+1} & \cdots & r_{1,L-1} & r_{1L} & \cdots & r_{1,M-1} & r_{1M} \\
y_2 & r_{21} & & & & & & & & & & r_{2M} \\
\vdots & \vdots & & \ddots & & & & & & & & \vdots \\
y_p & r_{p1} & & & & & & & & & & r_{pM} \\
y_{p+1} & r_{p+1,1} & & & & \ddots & & & & & & r_{p+1,M} \\
\vdots & \vdots & & & & & & & & & & \vdots \\
y_{L-1} & r_{L-1,1} & & & & & & \ddots & & & & r_{L-1,M} \\
y_L & r_{L1} & & & & & & & & & & r_{LM} \\
\vdots & \vdots & & & & & & & & \ddots & & \vdots \\
y_{M-1} & r_{M-1,1} & & & & & & & & & & r_{M-1,M} \\
y_M & r_{M1} & r_{M2} & \cdots & r_{Mp} & r_{M,p+1} & \cdots & r_{M,L-1} & r_{ML} & \cdots & r_{M,M-1} & r_{MM}
\end{pmatrix}$$

FIG. 6

$$R = \begin{pmatrix} & y_1^* & y_2^* & \cdots & y_p^* & y_{p+1}^* & \cdots & y_{L-1}^* & y_L^* & \cdots & y_{M-1}^* & y_M^* \\ y_1 & r_{11} & r_{12} & \cdots & r_{1p} & r_{1,p+1} & \cdots & r_{1,L-1} & r_{1L} & \cdots & r_{1,M-1} & r_{1M} \\ y_2 & r_{21} & & & & & & & & & & r_{2M} \\ \vdots & \vdots & & \ddots & & & & & & & & \vdots \\ y_p & r_{p1} & & & & & & & & & & r_{pM} \\ y_{p+1} & r_{p+1,1} & & & & \ddots & & & & & & r_{p+1,M} \\ \vdots & \vdots & & & & & & & & & & \vdots \\ y_{L-1} & r_{L-1,1} & & & & & & \ddots & & & & r_{L-1,M} \\ y_L & r_{L1} & & & & & & & & & & r_{LM} \\ \vdots & \vdots & & & & & & & & \ddots & & \vdots \\ y_{M-1} & r_{M-1,1} & & & & & & & & & & r_{M-1,M} \\ y_M & r_{M1} & r_{M2} & \cdots & r_{Mp} & r_{M,p+1} & \cdots & r_{M,L-1} & r_{ML} & \cdots & r_{M,M-1} & r_{MM} \end{pmatrix}$$

FIG. 9
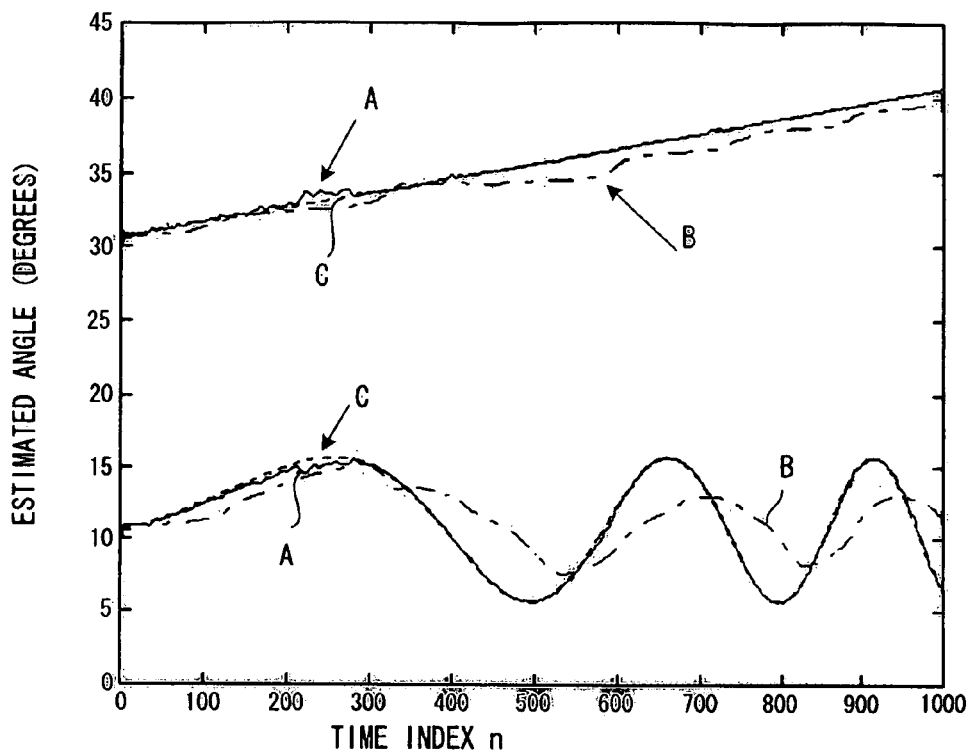
FIG. 10
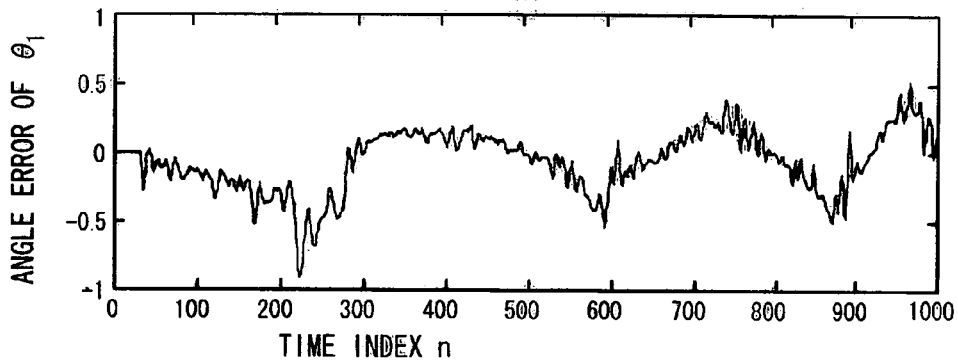
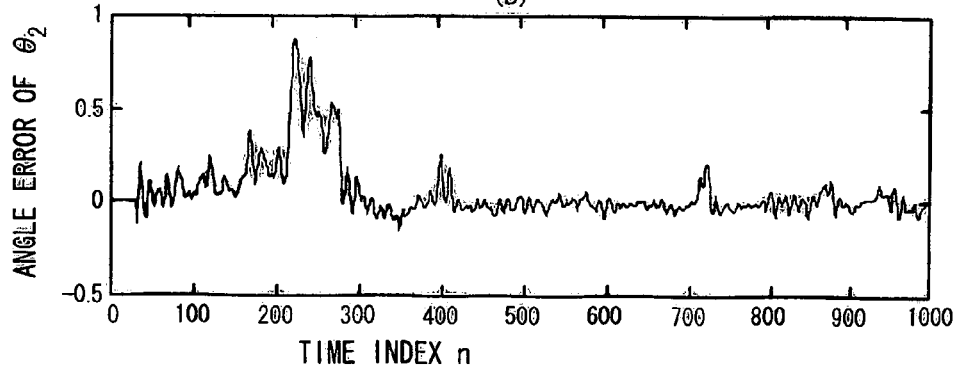

FIG. 15

$$R = \begin{pmatrix}
 & y_1^* & \cdots & y_{q+1}^* & y_{q+2}^* & y_{q+3}^* & \cdots & y_{L-1}^* & y_L^* & \cdots & y_{M-1}^* & y_M^* \\
y_1 & r_{11} & \cdots & r_{1,q+1} & r_{1,q+2} & r_{1,q+3} & \cdots & r_{1,L-1} & r_{1L} & \cdots & r_{1,M-1} & r_{1M} \\
\vdots & \vdots & & & & & & & & & & r_{2M} \\
 & & & & & & & & & & & \vdots \\
y_{q+1} & r_{q+1,1} & & & & & & & & & & r_{pM} \\
y_{q+2} & r_{q+2,1} & & & & & & & & & & r_{p+1,M} \\
y_{q+3} & r_{q+3,1} & & & & & & & & & & \vdots \\
\vdots & \vdots & & & & & & & & & & r_{M-q-p,M} \\
y_{q+p+1} & r_{q+p+1,1} & & & & & & & & & & \vdots \\
\vdots & \vdots & & & & & & & & & & \\
y_{L-1} & r_{L-1,1} & & & & & & & & & & r_{M-q-2,M} \\
y_L & r_{L1} & & & & & & & & & & r_{M-q-1,M} \\
\vdots & \vdots & & & & & & & & & & r_{M-q,M} \\
 & & & & & & & & & & & \vdots \\
y_{M-1} & r_{M-1,1} & & & & & & & & & & r_{M-1,M} \\
y_M & r_{M1} & \cdots & r_{M,p} & r_{M,p+1} & \cdots & r_{M,M-q-p} & \cdots & r_{M,M-q-1} & r_{M,M-q} & \cdots & r_{M,M-1} & r_{MM}
\end{pmatrix}$$

FIG. 16

$$R = \begin{pmatrix} & y_1^* & \cdots & y_{q+1}^* & y_{q+2}^* & y_{q+3}^* & \cdots & y_{L-1}^* & y_L^* & \cdots & y_{M-1}^* & y_M^* \\ y_1 & r_{11} & \cdots & r_{1,q+1} & r_{1,q+2} & r_{1,q+3} & \cdots & r_{1,L-1} & r_{1,L} & \cdots & r_{1,M-1} & r_{1M} \\ \vdots & \vdots & & & & r_{1,p+\bar{q}+1} & & & & & & r_{2M} \\ y_{q+1} & r_{q+1,1} & & \ddots & & & & & & & & r_{pM} \\ y_{q+2} & r_{q+2,1} & & & & & & & & & & r_{p+1,M} \\ y_{q+3} & r_{q+3,1} & & & \ddots & & & & & & & \vdots \\ y_{q+p+1} & r_{q+p+1,1} & & & & & & & & & & r_{M-q-p,M} \\ \vdots & \vdots & & & & & \ddots & & & & & \vdots \\ y_{L-1} & r_{L-1,1} & & & & & & & & & & r_{M-q-2,M} \\ y_L & r_{L,1} & & & & & & & \ddots & & & r_{M-q-1,M} \\ \vdots & \vdots & & & & & & & & \ddots & & r_{M-q} \\ & & & & & & & & & & & \vdots \\ y_{M-1} & r_{M-1,1} & & & & & & & & & & r_{M-1,M} \\ y_M & r_{M,1} & \cdots & r_{M,p} & r_{M,p+1} & \cdots & r_{M,M-q-p} & \cdots & r_{M,M-q-1} & r_{M,M-q} & \cdots & r_{M,M-1} & r_{MM} \end{pmatrix}$$

METHOD AND APPARATUS FOR ADAPTIVE DIRECTION ESTIMATION OF RADIO WAVES

BACKGROUND OF THE INVENTION

This application is a Continuation Application of PCT Application PCT/JP2004/011598, filed on Aug. 12, 2004, the contents of which are herein wholly incorporated by reference. This invention relates to a method and apparatus for directions-of-arrival (DOAs) estimation of radio waves impinge on an array antenna at a base station and relates to an apparatus of base station that variably controls the beam directivity of the antenna based on the estimated directions of radio waves (also be referred to as signals from the aspect of signal processing hereafter). Further, this invention relates to a method and apparatus for estimating the directions of multiple incoming signals (mutually uncorrelated signals, or partially correlated signals, or fully correlated (i.e., coherent) signals) in an on-line manner and quickly tracking the time-varying directions.

In recent years, research and development on applications of adaptive array antenna for mobile communications have attracted much attention. Herein an antenna created by placing multiple antenna elements at different spatial positions with a certain geometric shape is called an array antenna. The problem of estimating the directions of radio waves impinging on the antenna is one of the important fundamental techniques of an adaptive array antenna. For the problem of estimating the direction of a signal, subspace-based methods that use the orthogonality between the signal subspace and noise subspace are well known because of their good estimation accuracy and low computational load. A typical example is the MUSIC (multiple signal classification) (see non-patent document 1: R. O. Schmidt, "Multiple emitter location and signal parameter estimation," IEEE Trans. Antenna Propagation, vol. 34, no. 3, pp. 276-280 (1986). Also for the problem of direction estimation of coherent signals, the subspace-based method with preprocessing is well known as the spatial smoothing based MUSIC (see non-patent document 2: J. Shan, M N. Wax and T. Kailath, "On spatial smoothing for arrival direction estimation of coherent signals," IEEE Trans. Acoust., Speech, Signal Processing, vol. 33, no. 4, pp. 806-811 (1985); and non-patent document 3: S. U. Pillai and B. H. Kwon, "Forward/backward spatial smoothing techniques for coherent signals identification," IEEE Trans. Acoust., Speech, Signal, vol. 37, no. 1, pp. 8-15 (1989)).

In conventional subspace-based methods, in order to obtain the signal (or noise) subspace, it is necessary to perform eigendecomposition processing such as eigenvalue decomposition (EVD) or singular value decomposition (SVD) on the array covariance matrix. Also, in practical mobile communication systems, the signals from a user (i.e, mobile terminal) that are usually reflected from buildings or the like and impinge on the array antenna at base station via a direct path and some reflected paths, hence the direction estimation in a multipath propagation environment is very important. Furthermore, the directions of incident signals may change over time due to the movement of user (i.e., signal source), thus a tracking method is required to estimate the directions in an on-line manner.

However, when conventional subspace-based methods are used to estimate the time-varying directions in real-time, it is necessary to perform the EVD (or SVD) repeatedly, and hence the computational loads of these methods become very heavy and much processing time is required.

In order to explain the disadvantages of the conventional subspace-based DOA estimation methods, the spatial smoothing based MUSIC proposed in non-patent document 2 will be briefly described.

Here, it is assumed that p narrowband signals $\{s_k(n)\}$ are incident on a uniform linear array (ULA) with M elements from angles $\{\theta_k\}$. The signals received at the array elements can be expressed by the following equation 1.

$$y(n) = [y_1(n), y_2(n), \ldots, y_M(n)]^T = A(\theta(n))s(n) + w(n) \quad (1)$$

$$A(\theta(n)) \triangleq [a(\theta_1(n)), a(\theta_2(n)), \ldots, a(\theta_p(n))]$$

$$a(\theta_k(n)) \triangleq [1, e^{jw_0\tau(\theta_k(n))}, \ldots, e^{jw_0(M-1)\tau(\theta_k(n))}]^T$$

$$s(n) = [s_1(n), s_2(n), \ldots, s_p(n)]^T,$$

$$w(n) = [w_1(n), w_2(n), \ldots, w_M(n)]^T$$

$$w_0 = 2\pi f_0, \tau(\theta_k(n)) \triangleq (d/c)\sin\theta_k(n)$$

where $f_0$, c and d are the carrier frequency, propagation speed, and element interval (half wavelength of the carrier wave), respectively, $(\cdot)^T$ denotes the transposition, $a(\theta_k(n))$ and $A(\theta(n))$ are the array response vector and response matrix, and $w_1(n)$ is the temporally and spatially uncorrelated white Gaussian noise with zero-mean and variance $\sigma^2$.

First, the case of estimating constant directions will be considered, i.e., $\theta_k(n)=\theta_k$. For simplicity, $A(\theta(n))$ will be expressed as A below. Here, the array covariance matrix is expressed by the following equation.

$$R \triangleq E\{y(n)y^H(n)\} = AR_sA^H + \sigma^2 I_M \quad (2)$$

where $E(\cdot)$ and $(\cdot)H$ express the expectation and the complex conjugate transposition respectively, and $R_s=E[s(n)s^H(n)]$ is the source signal covariance matrix, and $I_M$ is an M×M identity matrix. Furthermore, the correlation $r_{ik}$ between the received data $y_i(n)$ and $y_k(n)$ is defined by $r_{ik}=E\{y_i(n)y^*_k(n)\}$, where $r_{ik}=r^*_{ki}$, exists, and $(\cdot)^*$ expresses the complex conjugate. Also, the array covariance matrix R of equation (2) can be clearly expressed by the following equation.

$$R = \begin{bmatrix} r_{11} & r_{12} & \cdots & r_{1M} \\ r_{21} & r_{22} & \cdots & r_{2M} \\ \vdots & \vdots & \ddots & \vdots \\ r_{M1} & r_{M2} & \cdots & r_{MM} \end{bmatrix} \quad (3)$$

In the spatial smoothing based MUSIC for estimating the directions $\{\theta_k\}$ of coherent signals, the entire array is divided into L overlapped subarrays with m ($1 \leq m \leq M$) elements as shown in FIG. 1. Here, m and L are called the subarray size and the number of subarrays, where L=M−m+1. From Equation 1, the signal vector of the l th subarray $y_l(n)$ can be expressed by Equation 4.

$$y(n)=[y_1(n),y_{l+1}(n),\ldots,y_{l+M-1}(n)]^T = A_m D^{l-1}s(n)+w_1(n)$$

$$A_m=[a_m(\theta_1),a_m(\theta_2),\ldots,a_m(\theta_p)]$$

$$a_m(\theta_k)=[1, e^{jw_0\tau(\theta_k)}, \ldots, e^{jw_0(m-1)\tau(\theta_{is\ k})}]^T$$

$$w(n)=[w_1(n), w_{l+1}(n), \ldots, w_{l-m+1}(n)]^T \quad (4)$$

for l=1, 2, ..., L, where D is a diagonal matrix with elements $e^{jw_0\tau(\theta_1)}, e^{jw_0\tau(\theta_2)}, \ldots, e^{jw_0\tau(m-1)\tau.(\theta_p)}$, and $a_m(\theta_k)$ and $A_m$ are the subarray response vector and response matrix. The l th subarray covariance matrix is given by Equation 5.

$$R_l = E\{y_l(n)y_l^H(n)\} = A_m D^{l-1} R_s (D^{l-1})^H A_m^H + \sigma^2 I_m \quad (5)$$

Then by spatially averaging the L subarray covariance matrices $\{R_l\}$, a covariance matrix is obtained as Equation 6.

$$\bar{R} = \frac{1}{L}\sum_{l=1}^{L} R_l \quad (6)$$

Hence the EVD of this spatially averaged covariance matrix is given by Equation 7 below.

$$\bar{R} = \sum_{i=1}^{m} \lambda_i e_i e_i^H = E\Lambda E^H \quad (7)$$

Here, $e_i$ and $\lambda_i$ are the eigenvectors and eigenvalues of the matrix $\bar{R}$, E is a matrix having a column $\{e_i\}$ and A is a diagonal matrix having elements $\{\lambda_i\}$. Also, the spaces spanned by the signal vectors $\{e_1, e_2, \ldots e_p\}$ and noise vectors $\{e_{p+1}, e_{p+2}, \ldots e_m\}$ are called the signal subspace and noise subspace, respectively. Further the signal subspace can be expressed by using the array response vector. The direction estimation method based on the orthogonal relationship between the signal subspace and the noise subspace is called subspace-based method.

By using eigenvalue analysis of the covariance matrix $\bar{R}$ of Equation 7, the following orthogonal relationship is established between the noise vectors $\{e_{p+1}, e_{p+2}, \ldots e_m\}$ and the subarray response vector $a_m(\theta_k)$ that belongs to the signal subspace.

$$e_i^H a_m(\theta_k) = 0 \quad (8)$$

for i=p+1, p+2, ... m. From this orthogonal relationship, it is possible to calculate a spectrum as given by the equation below.

$$\bar{P}_{ssmusic}(\theta) = \frac{1}{\sum_{i=p+1}^{m} |e_i^H a_m(\theta)|^2} \quad (9)$$

where $a_m(\theta)=[1, e^{jw_0\tau(\theta)}, e^{jw_0(m-1)}\tau(\theta)]^T$. Then the spatial smoothing based MUSIC estimates the directions of multiple incoming waves from the positions of p highest peaks of the spectrum given by Equation 9.

As shown in Equation 7, in subspace-based estimation methods such as the spatial smoothing based MUSIC, it is necessary to perform the EVD of the array/subarray covariance matrix in order to obtain the signal or noise subspace. However, in actual array implementations, particularly when the number of array elements is large or when the time-varying directions should be estimated in an on-line manner, the EVD (or SVD) process becomes computationally intensive and time-consuming. Therefore, applications of conventional subspace-based methods with eigendecomposition (i.e., EVD or SVD) are limited by the computational load thereof. Therefore, when the directions of the incident waves change over time, it is not possible to estimate these DOAs quickly and with high accuracy by using conventional methods, and it becomes impossible to generate an accurate receiving/transmitting beam at the base station, correspondingly the performance of the receiving and transmitting system of the base station will degrade.

Recently, some methods for adaptive direction estimation and tracking that do not use eigendecomposition have been proposed, for example, the adaptive SWEDE method (subspace-based methods without Eigendecomposition) (non-patent document 4: A. Eriksson, P. Stoica, and T. Soderstrom, "On-line subspace algorithms for tracking moving sources," IEEE Trans. Signal Processing, vol. 42, no. 9, pp. 2319-2330 (1994)). However, in the case of coherent signals, low signal-to-noise ratio (SNR) or small number of data, the performance of these methods becomes poor, and the amount of computational load required by these methods that use Least squares (LS) is large.

Moreover, the inventor has proposed a method and apparatus for estimating and tracking the direction of radio waves based on the cyclostationarity of communication signals (refer to non-patent document 5: J. Xin and A. Sano, "Directions-of-arrival tracking of coherent cyclostationary signals in array processing," IEIC Trans. Fundamentals vol. E86-A, no. 8, pp. 2037-2046 (2003), or patent document 1: International patent application PCT/JP03/08015; U.S. Pat. No. 7,084,812). But this method uses the temporal property the cyclostationary signals.

Furthermore, the inventor has proposed a computationally efficient direction estimation method called SUMWE (subspace-based method without eigendecomposition) (refer to non-patent document 6: J. Xin and A. Sano, "Computationally efficient subspace-based method for arrival direction estimation with eigendecomposition," IEEE Trans. Signal Processing, vol. 52, no. 4, pp. 876-893 (2004), or patent document 2: International patent application PCT/JP03/06411; U.S. Pat. No. 7,068,211). However, the online DOA estimation and the tracking of time-varying directions are not considered in this method.

SUMMARY OF THE INVENTION

Therefore the object of the present invention is to provide a method that is capable of estimating the directions of radio waves (i.e., uncorrelated, correlated or coherent signals) without the use of time-consuming processes such as the EVD/SVD and with a small amount of computational load and that is also capable of quickly tracking the time-varying directions in an on-line manner.

Another object of the present invention is that it be capable of being employed in conditions in which the additive noise at array elements is not only temporally and spatially uncorrelated white additive noise but also spatially correlated additive noise.

In order to estimate the time-varying DOAs quickly, a new direction estimation and tracking method based on the computationally efficient SUMWE is proposed. This invention is a direction estimation and tracking method, where a specified number (=p<M/2) of signals is received by a ULA with (=M) antenna elements.

A first form of the direction estimation method of this invention estimates the DOAs of radio waves in an environment of temporally and spatially uncorrelated white additive noise, and comprises:

a step of calculating the instantaneous cross-correlations at time n between a signal received at one antenna element and the signal s received at other antenna elements, a step of forming a Hankel correlation matrix from these (M−1) instantaneous cross-correlations and dividing this Hankel matrix into two upper and lower submatrices, a step of calculating a linear operator at time n from these upper and lower submatrices by using an adaptive algorithm with a fixed or time-varying step-size parameter, a step of estimating a noise subspace using the estimated linear operator, and a step of estimating the directions of the coherent signals at time n from the noise subspace by using Newton approximation.

A second form of the direction estimation method of this invention estimates the DOAs of radio waves in an environment of spatially correlated additive noise, where the length of the spatial correlation of the additive noise is assumed to be q ($0 \leq q \leq M-1$), and comprises:

a step of calculating the instantaneous cross-correlations at time n between the signal received at one antenna element and the signals received at other antenna elements, a step of forming a Hankel correlation matrix from these (M−q−1) instantaneous cross-correlations and dividing this Hankel matrix into two upper and lower submatrices, a step of calculating a linear operator at time n from these upper and lower submatrices by using an adaptive algorithm with a fixed or time-varying step-size parameter, a step of estimating a noise subspace using the estimated linear operator, and a step of estimating the directions of the coherent signals at time n from the noise subspace by using Newton approximation.

This invention is a direction estimation apparatus, where a specified number (=p<M/2) of signals is received by a ULA with (=M) antenna elements, and the directions of these signals are estimated from the signal s received at antenna elements.

A first form of the direction estimation apparatus of this invention estimates the directions of radio waves in an environment of temporally and spatially uncorrelated white additive noise, and comprises:

means for calculating the instantaneous cross-correlations at time n between the signal received at one antenna element and the signal s received at other antenna elements; means for forming a Hankel correlation matrix from these (M−1) instantaneous cross-correlations and dividing this Hankel correlation matrix into two upper and lower submatrices; means for calculating a linear operator at time n from these upper and lower submatrices by using an adaptive algorithm with a fixed or time-varying step-size parameter; means for estimating a noise subspace using the estimated linear operator; and means for estimating the directions of the coherent signals at time n from the noise subspace by using Newton approximation.

A second form of the direction estimation apparatus of this invention estimates the directions of radio waves in an environment of spatially correlated additive noise, where the length of the spatial correlation of the additive noise is assumed to be q ($0 \leq q \leq M-1$), and comprises:

means for calculating the instantaneous cross-correlations at time n between the signal received at one antenna element and the signals received at other antenna elements; means for forming a Hankel correlation matrix from these (M−q−1) instantaneous cross-correlations and dividing this Hankel matrix into two upper and lower submatrices; means of calculating a linear operator at time n from these upper and lower correlation matrices by using an adaptive algorithm with a fixed or time-varying step-size parameter; means for estimating a noise subspace using that linear operator; and means for estimating the directions of the coherent signals at time n from the noise subspace by using Newton approximation.

With this invention it is not necessary to calculate the correlations between the all signals received at array elements, and it is not necessary to perform eigendecomposition, hence it is possible to reduce the amount of computational load. Moreover, with this invention, it is possible to estimate the directions of radio waves in both an environment of temporally and spatially uncorrelated white additive noise and an environment of spatially correlated additive noise.

BRIEF DESCRIPTION OF THE DRAWINGS

FIG. 5 is a drawing showing the necessary column elements in an instantaneous array covariance matrix for direction estimation.

FIG. 6 is a drawing showing the necessary row elements in an instantaneous array covariance matrix for direction estimation.

FIG. 9 is a drawing showing the simulation results of estimated direction in a first embodiment.

FIG. 10 is a drawing showing the simulation results of estimation error in a first embodiment.

FIG. 15 is a drawing showing the necessary column elements of the instantaneous array covariance matrix for direction estimation when the length of the spatial correlation of additive noise is q.

FIG. 16 is a drawing showing the necessary row elements of the instantaneous array covariance matrix for direction estimation when the length of the spatial correlation of additive noise is q.

FIG. 17 is a drawing for forming Hankel instantaneous correlation matrix using the elements of the first column or the last column of the instantaneous array covariance matrix and dividing the matrix into two upper and lower submatrices, when the length of the spatial correlation of additive noise is q.

FIG. 18 is a drawing for forming Hankel instantaneous correlation matrix using the elements of the first row or the last row of the instantaneous array covariance matrix of the invention and dividing the matrix into two upper and lower submatrices, when the length of the spatial correlation of additive noise is q.

Figure 1:
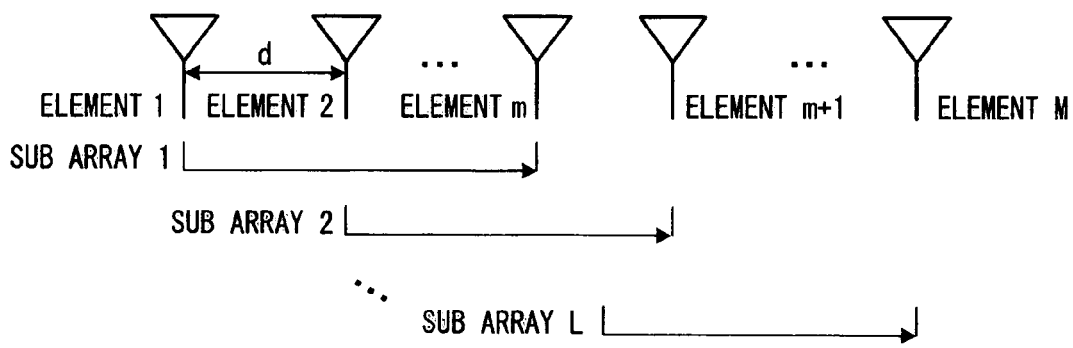
FIG. 1 is a drawing showing the general subarrays in a uniform linear array (ULA).

DESCRIPTION OF THE PREFERRED EMBODIMENTS (A) First Embodiment

This invention relates to an apparatus and method for estimating the directions of radio waves at a base station, and here the direction estimation will be explained with reference to the drawings. In the drawings, the same reference numbers will be given to parts or functions that are the same.

Figure 2:
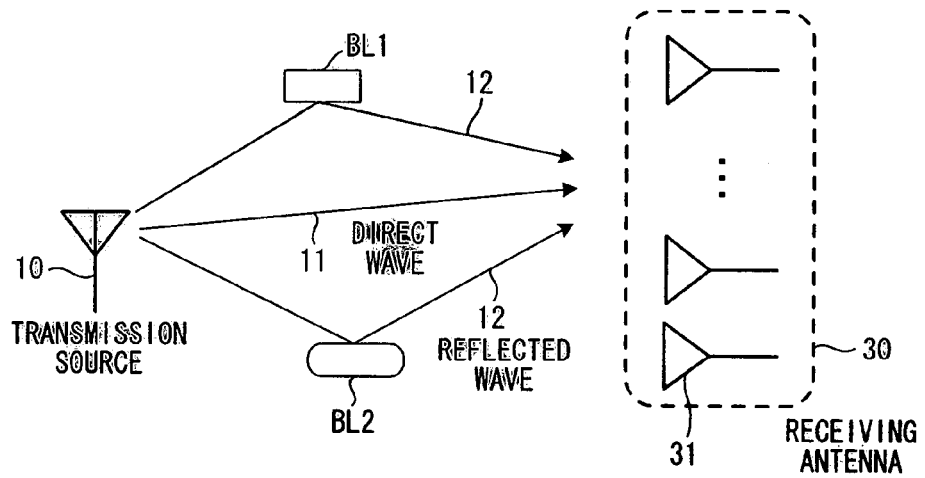
FIG. 2 is a drawing showing the arrangement of the transmitting source and receiving antenna at base station.

FIG. 1 is a drawing showing the construction of a ULA in which M antenna elements are located in a straight line at a distance interval of d. FIG. 2 is a drawing showing the positional relationship between the transmitting source 10 and the base station receiving antenna (array antenna) 30. In FIG. 2, the incoming signal from the transmitting source 10 impinging on the array antenna 30 is the direct wave 11, and the other incident signals are the reflected waves 12 due to reflection by buildings BL1, BL2 and the like. In the example shown in FIG. 2, two reflected waves are shown, however, hereafter, the total number of waves (coherent signals) including the direct and reflected waves from the transmitting source 10 is assumed to be p. Also, it is assumed that p is known. Furthermore, the relationship between the direct wave and the reflected waves can be expressed by the following equation.

$$s_k(n) = \beta_k s_1(n) \quad (10)$$

Here, $\beta_k$ is the multipath coefficient that expresses the complex attenuation of the reflected waves $s_k(n)$ with respect to the direct wave $s_1(n)$, while $\beta_k \neq 0$, and $\beta_1 = 1$.

Figure 3:
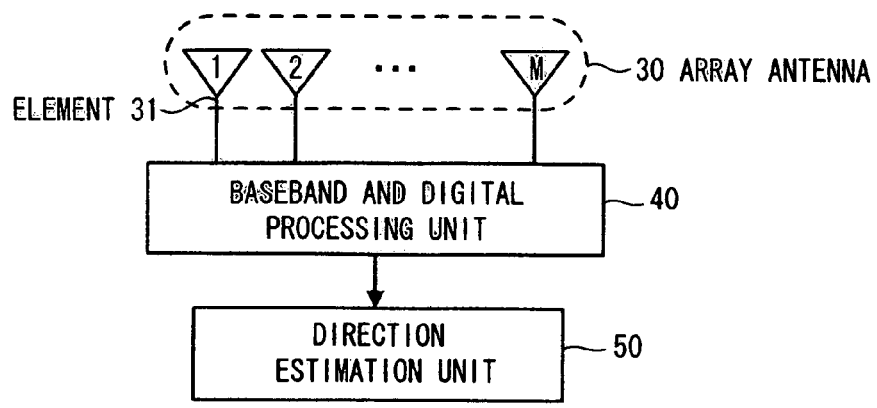
FIG. 3 is a block diagram showing the construction of the system for direction estimation of the present invention.

FIG. 3 is a block diagram showing the direction estimation system that comprises: an array antenna 30, baseband and digital processing unit 40 and a direction estimation unit 50. Moreover, the array antenna 30 comprises M number (M>2p) of antenna elements 31.

Figure 4:
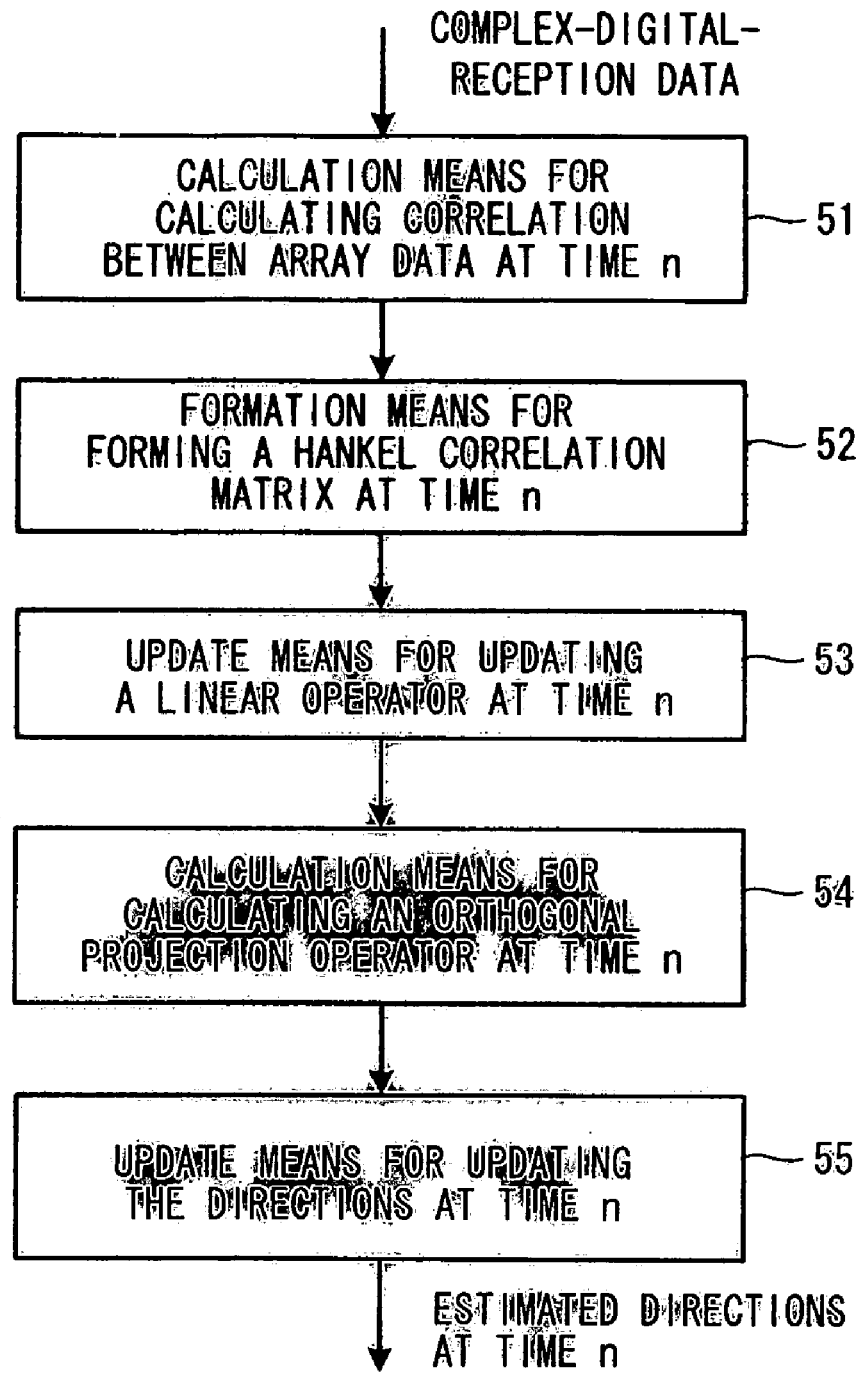
FIG. 4 is a block diagram showing the operation of a first embodiment of the estimation unit of this invention for direction estimation.

FIG. 4 is a drawing showing the construction of the direction estimation unit 50. This direction estimation unit 50 comprises: a correlation calculation unit 51 for calculating the instantaneous cross-correlations between array data at time n, a formation unit 52 for forming the Hankel correlation matrix at time n, an update unit 53 for updating the linear operator at time n, a projector calculation unit 54 for calculating an orthogonal projection operator at time n, and a update unit 55 for updating the directions of radio waves at time n.

Generally, for estimating the directions of radio waves from the signals received by the array antenna 30, the correlations between all received signals are calculated, and the array covariance matrix R is given by the following equation in an environment of temporally and spatially uncorrelated white additive noise.

$$R = \qquad (11)$$

$$E\{y(n)y^H(n)\} = \begin{bmatrix} r_{11} & r_{12} & \cdots & r_{1M} \\ r_{21} & r_{22} & \cdots & r_{2M} \\ \cdots & \cdots & \cdots & \cdots \\ r_{M1} & r_{M2} & \cdots & r_{MM} \end{bmatrix} = \begin{bmatrix} \bar{r}_{11} & \bar{r}_{12} & \cdots & \bar{r}_{1M} \\ \bar{r}_{21} & \bar{r}_{22} & \cdots & \bar{r}_{2M} \\ \cdots & \cdots & \cdots & \cdots \\ \bar{r}_{M1} & \bar{r}_{M2} & \cdots & \bar{r}_{MM} \end{bmatrix} +$$

$$\begin{bmatrix} \sigma^2 & 0 & \cdots & 0 \\ 0 & \sigma^2 & \cdots & 0 \\ \cdots & \cdots & \cdots & \cdots \\ 0 & 0 & \cdots & \sigma^2 \end{bmatrix}$$

However, $x_i(n)$ is a noiseless signal received, and $w_i(n)$ is additive noise, so that following relationship exists.

$$y_i(n) = x_i(n) + w_i(n)$$

$$E\{w_i(n)w_j^*(n)\} = \sigma^2 \ (i=j)$$

$$E\{w_i(n)w_j^*(n)\} = 0 \ (i \neq j)$$

In other words, in an environment of temporally and spatially uncorrelated white additive noise, the influence of additive noise is included in the diagonal elements $r_{11}, r_{22}, \ldots, r_{MM}$ of the array covariance matrix R.

Since the array covariance matrix R is conjugate symmetrical, in order to estimate the directions, only the first column and the last column as shown in FIG. 5 or the first row and last row as shown in FIG. 6 need to be calculated. However, as mentioned above, since the noise variance is included in the diagonal elements, the diagonal elements $r_{11}, r_{MM}$ are eliminated from each column and row as shown in FIG. 5 and FIG. 6.

Below, the procedure performed by the direction estimation unit 50 will be explained. First, the correlation calculation unit 51 for calculating the instantaneous cross-correlations by using the array data vector y(n) as given by Equation 1 obtained from the baseband and digital processing unit 40. Furthermore, the instantaneous correlation vector s of signals y(n) and y*M(n), and y(n) and y*1(n) at sample time n are given by Equation 12.

$$\phi(n) = y(n)y_M^*(n), \ \bar{\phi}(n) = y(n)y^*(n) \qquad (12)$$

Next, the formation unit 52 uses these correlations obtained from Equation 12 to form (M−p)×p Hankel correlation matrices, $$\Phi_f(n), \bar{\Phi}_f(n), \Phi_b(n), \bar{\Phi}_b(n)$$

and then divide them into two upper and lower submatrices, respectively.

$$\Phi_{f1}(n), \Phi_{f2}(n); \bar{\Phi}_{f1}(n), \bar{\Phi}_{f2}(n); \Phi_{b1}(n), \Phi_{b2}(n); \bar{\Phi}_{b1}(n), \bar{\Phi}_{b2}(n)$$

Figure 7:
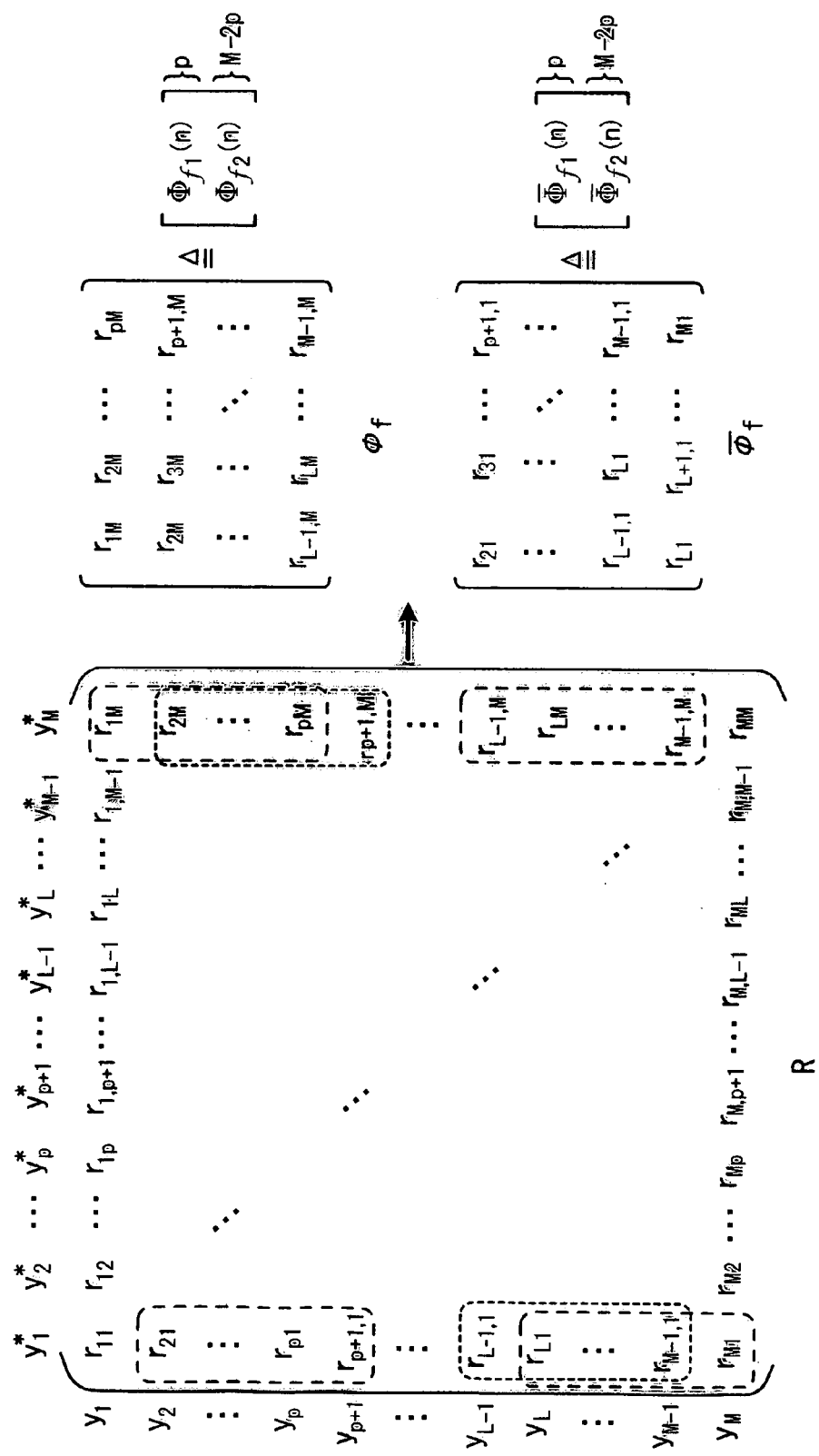
FIG. 7 is a drawing for forming Hankel instantaneous correlation matrix using the elements of the first column or the last column of the instantaneous array covariance matrix of the invention and dividing the matrix into two upper and lower submatrices.

In other words, the correlation calculation unit 51 calculates the instantaneous cross-correlations $$r_{1M}(n), r_{2M}(n), \ldots r_{M-1,M}(n)$$

at time n between the signal received at the Mth antenna element and the signals received at the first, second, . . . (M−1)th antenna elements, which correspond to the elements in the last column of array covariance matrix as shown in FIG. 5. Next, as shown in FIG. 7, the formation unit 52 selects (M−p) pairs each of which is consisted of p cross-correlations from these (M−1) instantaneous correlations to form a (M−p)×p Hankel correlation matrix $\Phi_f(n)$ and divides this Hankel matrix into an upper p×p matrix $\Phi_{f1}(n)$ and a lower (M−2p)×p matrix $\Phi_{f2}(n)$. Similarly, the correlation calculation unit 51 calculates the instantaneous cross-correlations $$r_{21}(n), r_{31}(n), \ldots r_{M1}(n)$$

at time n between the signal received at the first antenna element and the signals received at the second, third, ..., Mth antenna elements, which correspond to the elements in the first column of array covariance matrix as shown in FIG. 5. Next, as shown in FIG. 7, the formation unit 52 selects (M−p) pairs each of which is consisted of p cross-correlations from these (M−1) instantaneous correlations to form a (M−p)×p Hankel correlation matrix $\overline{\Phi}_f(n)$ and divides this Hankel matrix into an upper p×p matrix $\overline{\Phi}_{f1}(n)$ and a lower (M−2p)×p matrix $\overline{\Phi}_{f2}(n)$.

Figure 8:
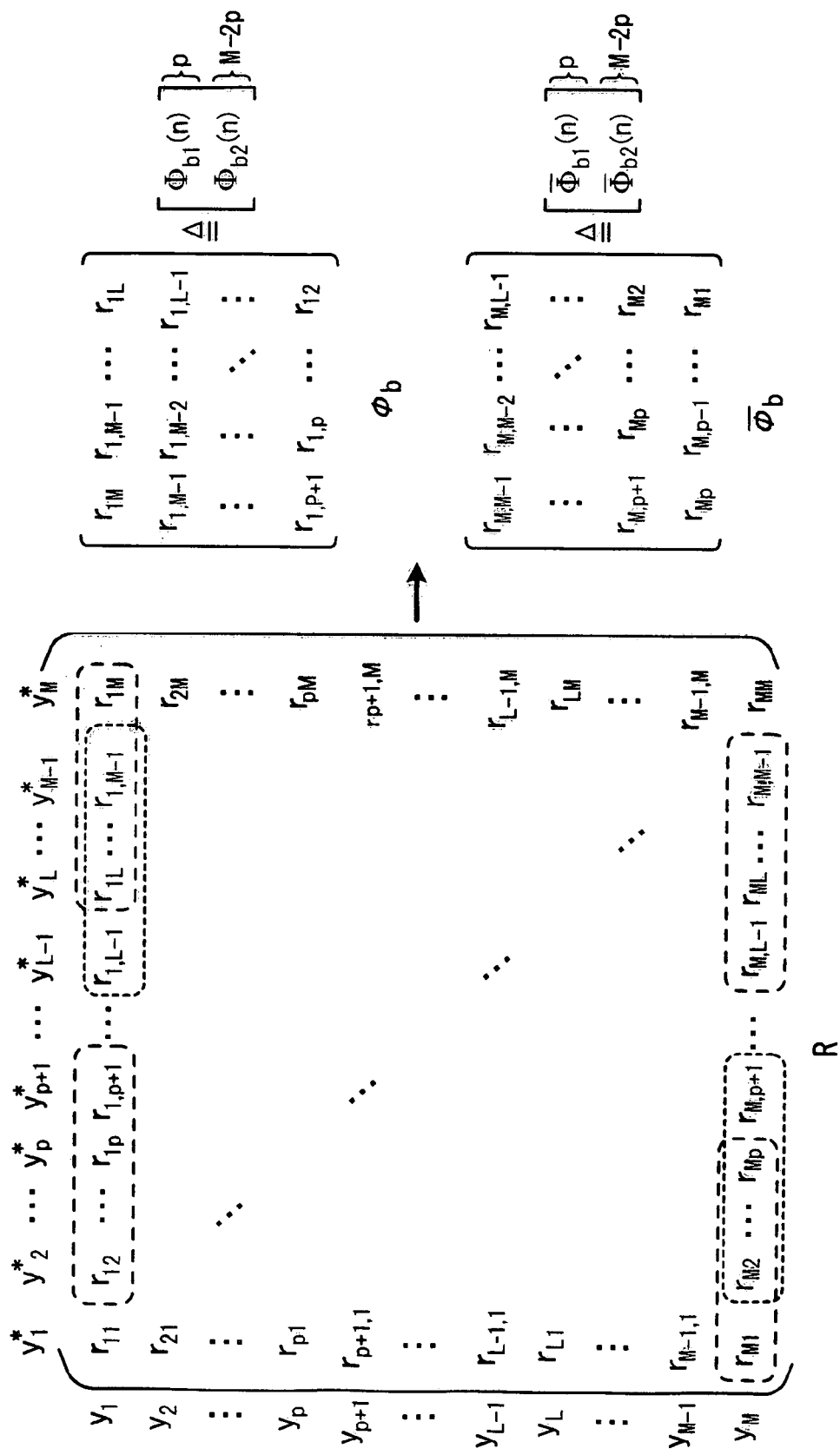
FIG. 8 is a drawing for forming Hankel instantaneous correlation matrix using the elements of the first row or the last row of the instantaneous array covariance matrix of the invention and dividing the matrix into two upper and lower submatrices.

In analogous way, the correlation calculation unit 51 calculates the instantaneous cross-correlations $$r_{12}(n), r_{13}(n), \ldots r_{1,M}(n)$$

at time n between the signal received at the first antenna element and the signals received at the second, third, ..., Mth antenna elements, which correspond to the elements in the first row of array covariance matrix as shown in FIG. 6. Next, as shown in FIG. 8, the formation unit 52 selects (M−p) pairs each of which is consisted of p cross-correlations from these (M−1) instantaneous correlations to form a (M−p)×p Hankel correlation matrix $\Phi_b(n)$ and divides this Hankel matrix into an upper p×p matrix $\Phi_{b1}(n)$ and a lower (M−2p)×p matrix $\Phi_{b2}(n)$. Similarly, the correlation calculation unit 51 calculates the instantaneous cross-correlations $$r_{M1}(n), r_{M2}(n), \ldots r_{M,M-1}(n)$$

at time n between the signal received at the Mth antenna element and the signals received at the first, second, ..., (M−1)th antenna elements of, which correspond to the elements in the last row of array covariance matrix as shown in FIG. 6. Next, as shown in FIG. 8, the formation unit 52 selects (M−p) pairs each of which is consisted of p cross-correlations from these (M−1) instantaneous correlations to form a (M−p)×p Hankel correlation matrix $\overline{\Phi}_b(n)$ and divides this Hankel matrix into an upper p×p matrix $\overline{\Phi}_{b1}(n)$ and a lower (M−2p)×p matrix $\overline{\Phi}_{b2}(n)$.

Next, the update unit 53 uses $$(\Phi_{f1}(n), \Phi_{f2}(n); \overline{\Phi}_{f1}(n), \overline{\Phi}_{f2}(n); \Phi_{b1}(n), \Phi_{b2}(n); \overline{\Phi}_{b1}(n), \overline{\Phi}_{b2}(n))$$

to form two matrices as $$\Phi_1(n) = [\Phi_{f1}(n), \overline{\Phi}_{f1}(n), \Phi_{b1}(n), \overline{\Phi}_{b1}(n)]$$

$$\Phi_2(n) = [\Phi_{f2}(n), \overline{\Phi}_{f2}(n), \Phi_{b2}(n), \overline{\Phi}_{b2}(n)] \quad (13)$$

and by using these two matrices $\Phi_1(n)$, $\Phi_2(n)$ and the linear operator P(n−1) at time n−1, the following estimation error matrix E(n) is calculated as $$E(n) = \Phi^H_2(n) - \Phi^H_1(n)P(n-1) \quad (14)$$

Then the update unit 53 estimate the linear operator P(n) at time n by using an adaptive LMS algorithm with a fixed step-size parameter μ as $$P(n) = P(n-1) + \mu \Phi_1(n) \cdot E(n) \quad (15)$$

where μ is a positive step-size parameter that satisfies the following.

$$0 < \mu < \frac{2}{tr\{\overline{\varphi}_1\}}, \quad \overline{\varphi}_1 = E\{\Phi_1(n)\Phi^H_1(n)\}$$

while tr{·} is a trace operation.

On the other hand, the direction $\{\theta_k\}$ can be estimated by minimizing the cost function below.

$$f(\theta) = \overline{a}^H(\theta) \pi(n) \overline{a}(\theta)$$

$$\overline{a}(\theta) = [1, e^{j\omega_0 \tau(\theta)}, \ldots, e^{j\omega_0(M-p-1)\tau(\theta)}]^T$$

$$\pi(n) = Q(n)(Q^H(n)Q(n))^{-1}Q^H(n)$$

$$Q(n) = [P^T(n), -I_{M-2p}]^T \quad (16)$$

Then by using the matrix inversion lemma, the orthogonal projection operator π(n) at time n can be expressed as the following equation.

$$\pi(n) = Q(n)(I_{M-2p} - P^H(n)(P(n)P^H(n) + I_p)^{-1}P)(n))Q^H(n) \quad (17)$$

and the QR decomposition of $P(n)P^H(n) + I_p$ in Equation 17 is given by Equation 18.

$$P(n)P^H(n) + I_P \overset{\Delta}{=} \overline{P} = \overline{QR} \quad (18)$$

where $\overline{Q}$, $\overline{R}$ are a p×p unitary matrix, and a p×p upper-triangular matrix, respectively. Therefore, the orthogonal projection operator π(n) in Equation 17 can be rewritten as the equation below.

$$\pi(n) = Q(n)(I_{M-2p} - P^H(n)\overline{R}^{-1}\overline{Q}^H P(n))Q^H(n) \quad (19)$$

From the above, the projector calculation unit 54 calculates the orthogonal projection operator π(n) by using (18) and (19).

Next by minimizing the cost function $f(\theta)$ in Equation 16, the online estimation of the direction is considered. The estimation error for the direction $\theta_k$ can be expressed by the following equation.

$$\hat{\theta}_k - \theta_k = \frac{f'(\theta_k)}{f''(\theta_k)} \approx -\frac{\text{Re}\{\overline{d}^H(\theta_k)\Pi(n)\overline{a}(\theta_k)\}}{\overline{d}^H(\theta_k)\Pi(n)\overline{d}(\theta_k)} \quad (20)$$

where f'(θ) and f"(θ) are first and second derivatives of f(θ) with respect to θ, and $$\overline{d}(\theta) = d\overline{a}(\theta)/d\theta$$

Therefore, the direction $\theta_k$ at time n can be calculated by the following Newton approximation as shown in Equation 21

$$\hat{\theta}_k(n) = \hat{\theta}_k(n-1) - \frac{\text{Re}\{\overline{d}^H(\theta_k)\Pi(n)\overline{a}(\theta_k)\}}{\overline{d}^H(\theta_k)\Pi(n)\overline{d}(\theta_k)} \quad (21)$$

$$\overline{d}(\theta) = j\omega_0(d/c)\cos\theta_k[0, e^{j\omega_0\tau(\theta)}, 2e^{j\omega_0\tau(\theta)}, \ldots, (M-p-1)e^{j\omega_0(M-p-1)\tau(\theta)}]^T$$

Therefore the update unit 55 calculates the direction at time n by using Equation 21.

As described above, the direction estimation unit 50 uses an LMS algorithm with a fixed step-size μ and the Newton approximation method to estimate and track the directions at time n. This will be explained in more detail by using a concrete example of a computer simulations. Here, the number of ULA elements is taken to be M=16, and the direction $\theta_1(n)$, $\theta_2(n)$ of two coherent signals (p=2) with equal power impinge on the array antenna from $\theta_1(n)=30°+0.01°\times(n-1)$ $\theta_2(n)=10°+5° \sin(2\pi(4\times10^{-4}n+2.25\times10^{-6}n^2))$.

while SNR is 10 dB, and the LMS step-size is $\mu=8\times10^{-4}$. The averaged estimates $\hat{\theta}_1(n), \hat{\theta}_2(n)$ that are obtained from 100 trials, and the estimation errors are plotted in FIG. 9 and FIG. 10, respectively. For comparison, the estimated directions by the invention (curve A), the estimated directions by the adaptive SWEDE method (curve B) and the actual directions (curve C) are shown in FIG. 9. From FIG. 9 and FIG. 10, we can find that the time-varying directions of coherent signals can be estimated quickly and accurately by using this invention (with the fixed step-size LMS algorithm).

First Variation (Using the LMS Algorithm with Time-Varying Step-Size)

Figure 11:
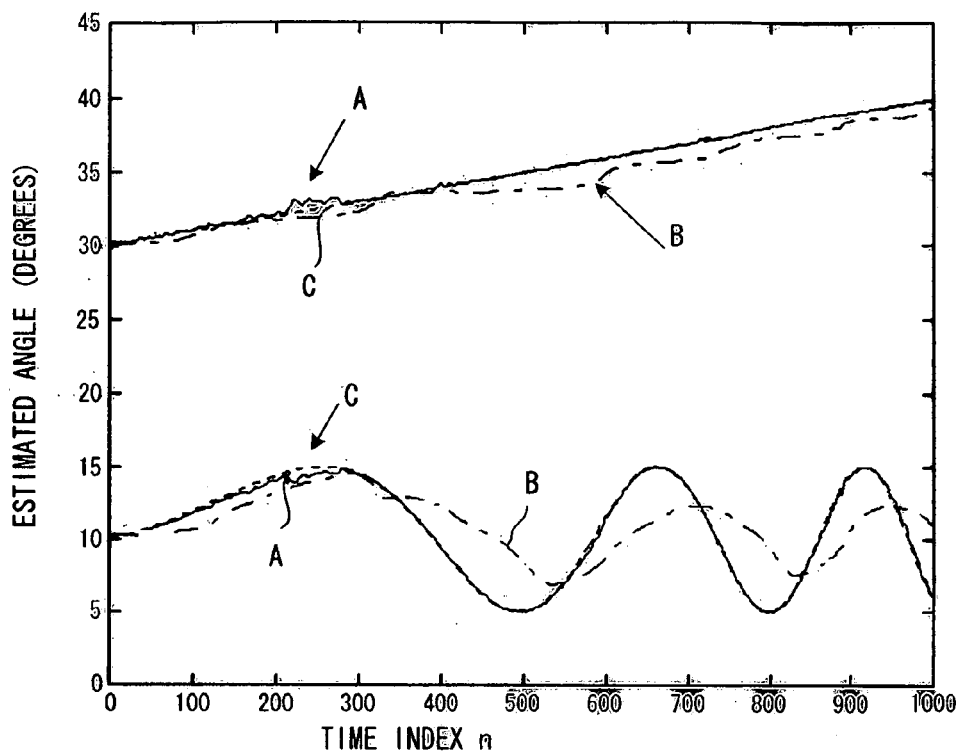
FIG. 11 is a drawing showing the simulation results of estimated direction in a first variation.
Figure 12:
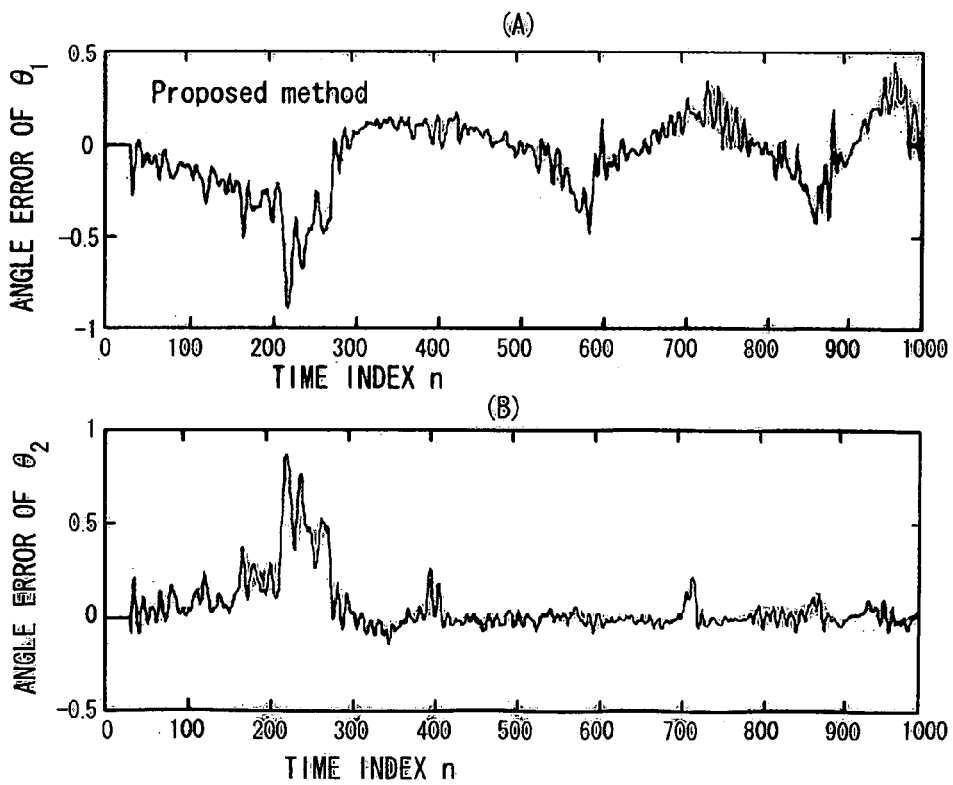
FIG. 12 is a drawing showing the simulation results of estimation error in a first variation.

In the description above, the linear operator P(n) is calculated by using an adaptive LMS algorithm as shown in Equation 15, where the step-size parameter μ is fixed. However, a time-varying step-size μ can be used in the adaptation. In other words, from the instantaneous correlation matrix $\Phi_1(n)$ at time n, the step-size μ can be determined by the following equation $\mu=2/tr\{\Phi_1(n)\Phi_1^H(n)\}$ (22)

then an LMS algorithm with a time-varying step-size μ becomes possible. This will be explained in more detail below by using a concrete example of computer simulations. Here, the number of ULA elements is taken to be M=16, and the directions $\theta_1(n)$ and $\theta_2(n)$ of two coherent signals (p=2) with equal power are incident on the array antenna from $\theta_1(n)=30°+0.01\times(n-1)$ $\theta_2(n)=10°+5° \sin(2\pi(4\times10^{-4}n+2.25\times10^{-6}n^2))$.

where SNR is 10 dB. The averaged estimates $\hat{\theta}_1(n), \hat{\theta}_2(n)$ that are obtained from 100 trails, and the estimation errors are as shown in FIG. 11 and FIG. 12, respectively. For comparison, the estimated directions of the invention (curve A), the estimated directions of the adaptive SWEDE method (curve B) and the actual angles (curve C) are shown in FIG. 11. As can be clearly seen from FIG. 11 and FIG. 12, it is possible to quickly and accurately estimate the time-varying directions of coherent signals by using the proposed invention (with the time-varying step-size LMS algorithm).

Second Variation (Using the NLMS Algorithm)

In the first embodiment, the linear operator P(n) is calculated by using the adaptive LMS algorithm shown as Equation 15, however, it is also possible to calculate the linear operator P(n) by using an adaptive normalized LMS (NLMS) algorithm given by the equation below.

$P(n)=P(n-1)+\bar{\mu}\bar{R}^{-1}\bar{Q}^H\Phi_1(n)E(n)$ (23)

where Q, R are a p×p unitary matrix, and a p×p upper-triangular matrix, respectively, which are the QR decomposition factors of $\Phi_1(n)\Phi_1^H(n)$ given by Equation 24.

$\Phi_1(n)\Phi_1^H(n)=\overline{QR}$ (24)

where the stability condition of the step-size parameter in the adaptive NLMS algorithm is given by.

$0<\bar{\mu}<2$

Figure 13:
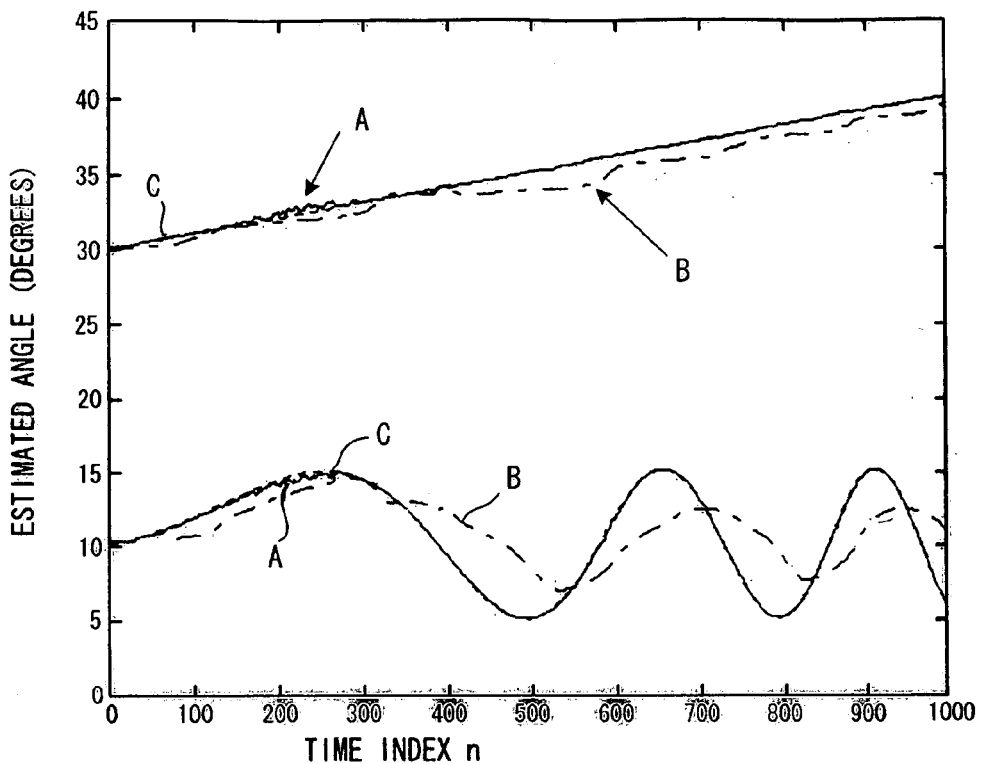
FIG. 13 is a drawing showing the simulation results of estimated direction in a second variation.
Figure 14:
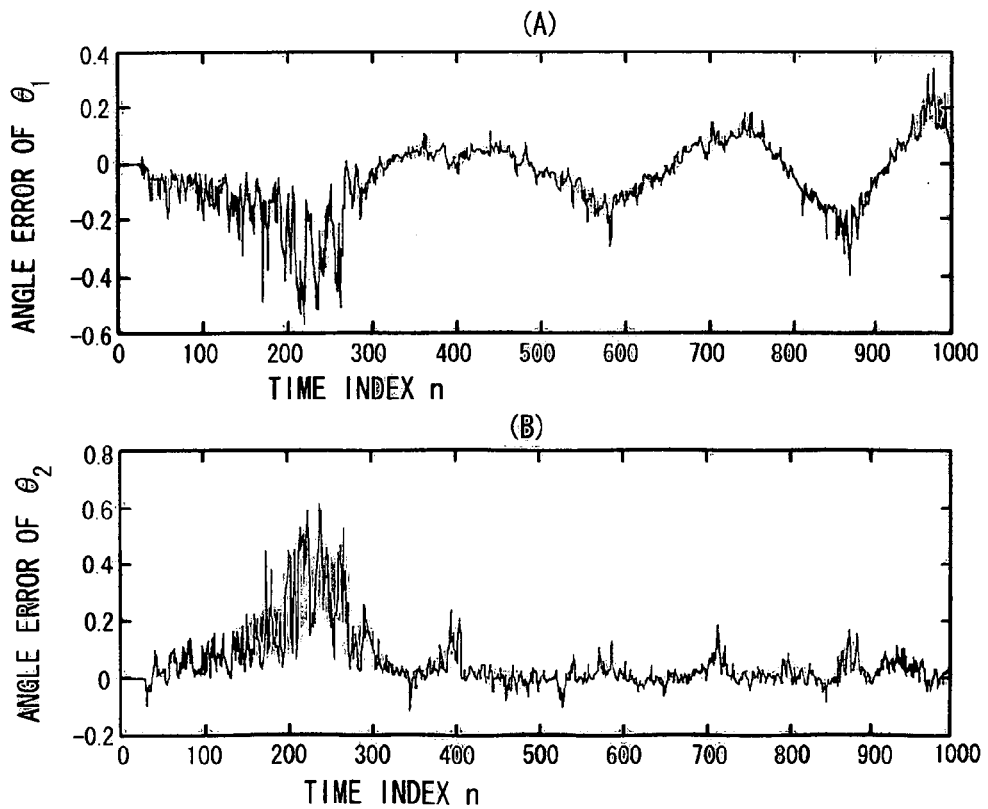
FIG. 14 is a drawing showing the simulation results of estimation error in a second variation.

As described above, in the environment of temporally and spatially uncorrelated white additive noise, it is possible to simply perform estimation and tracking of the directions of coherent signals by using the NLMS algorithm and Newton approximation. This will be explained in more detail below through concrete example of computer simulations. Here, the number of ULA elements is taken to be M=16, and the directions $\theta_1(n)$ and $\theta_2(n)$ of two coherent signals (p=2) with equal power are incident on the array antenna from $\theta_1(n)=30°+0.01°\times(n-1)$ $\theta_2(n)=10°+5° \sin(2\pi(4\times10^{-4}n+2.25\times10^{-6}n^2))$.

where SNR is 10 dB. The averaged estimates $\hat{\theta}_1(n), \hat{\theta}_2(n)$ that are obtained from 100 trails, and the estimation errors are as shown in FIG. 13 and FIG. 14, respectively. For comparison, the estimated directions of the invention (curve A), the estimated directions of the adaptive SWEDE method (curve B) and the actual angles (curve C) are shown in FIG. 13. As shown FIG. 13 and FIG. 14, it is possible to quickly and accurately estimate the time-varying directions of coherent signals (coherent signals) by using the proposed invention (with the NLMS algorithm).

(B) Second Embodiment

In the first embodiment, four Hankel correlation matrices $\Phi_f(n), \overline{\Phi}_f(n), \Phi_b(n), \overline{\Phi}_b(n)$ are formed, and each is divided into two upper and lower submatrices $\Phi_{f1}(n), \Phi_{f2}(n); \overline{\Phi}_{f1}(n), \overline{\Phi}_{f2}(n); \Phi_{b1}(n), \Phi_{b2}(n); \overline{\Phi}_{b1}(n), \overline{\Phi}_{b2}(n)$ (A)

and further two matrices $\Phi_1(n)$, $\Phi_2(n)$ are formed from these matrices as shown in Equation 13, then a linear operator P(n) is calculated by using these matrices $\Phi_1(n)$, $\Phi_2(n)$ and finally the directions of radio waves are estimated. However, it is possible to form the matrices $\Phi_1(n)$, $\Phi_2(n)$ by arbitrarily using one of four groups shown in (A) above, while the first embodiment is the case of forming the matrices $\Phi_1(n)$, $\Phi_2(n)$ by using four groups of the above (A) as shown in (13).

Embodiment Using One Arbitrary Group

One arbitrary group is selected from among the four groups in (A) above, and the matrices $\Phi_1(n)$, $\Phi_2(n)$ are determined from one of the following equations $\Phi_1(n)=\Phi_{f1}(n), \Phi_2(n)=\Phi_{f2}(n)$ (25a)

$\Phi_1(n)=\overline{\Phi}_{f1}(n), \Phi_2(n)=\overline{\Phi}_{f2}(n)$ (25b)

$\Phi_1(n)=\overline{\Phi}_{b1}(n), \Phi_2(n)=\overline{\Phi}_{b2}(n)$ (25c)

$\Phi_1(n)=\overline{\Phi}_{b1}(n), \Phi_2(n)=\overline{\Phi}_{b2}(n)$ (25d)

Also, by using these two matrices $\Phi_1(n)$, $\Phi_2(n)$, a linear operator P(n) is calculated by using the adaptive LMS with a fixed or time-varying step-size parameter or the NLMS algorithm at time n, and a noise subspace is estimated from that linear operator, then the directions of coherent signals at time n are estimated by using Newton approximation in an environment of temporally and spatially uncorrelated white additive noise.

(b) Embodiment Using Two Arbitrary Groups

Two arbitrary groups are selected from among the four groups shown in (A) above, and the matrices $\Phi_1(n)$, $\Phi_2(n)$ are determined from one of the following equations $$\Phi_1(n)=[\Phi_{f1}(n),\overline{\Phi}_{f1}(n)],\ \Phi_2(n)=[\Phi_{f2}(n),\overline{\Phi}_{f2}(n)] \quad (26a)$$

$$\Phi_1(n)=[\Phi_{f1}(n),\Phi_{b1}(n)],\ \Phi_2(n)=[\Phi_{f2}(n),\Phi_{b2}(n)] \quad (26b)$$

$$\Phi_1(n)=[\Phi_{f1}(n),\overline{\Phi}_{b1}(n)],\ \Phi_2(n)=[\Phi_{f2}(n),\overline{\Phi}_{b2}(n)] \quad (26c)$$

$$\Phi_1(n)=[\overline{\Phi}_{f1}(n),\overline{\Phi}_{b1}(n)],\ \Phi_2(n)=[\overline{\Phi}_{f2}(n),\Phi_{b2}(n)] \quad (26d)$$

$$\Phi_1(n)=[\overline{\Phi}_{f1}(n),\overline{\Phi}_{b1}(n)],\ \Phi_2(n)=[\overline{\Phi}_{f2}(n),\overline{\Phi}_{b2}(n)] \quad (26e)$$

$$\Phi_1(n)=[\Phi_{b1}(n),\overline{\Phi}_{b1}(n)],\ \Phi_2(n)=[\Phi_{b2}(n),\overline{\Phi}_{b2}(n)] \quad (26f)$$

Also, by using these two matrices $\Phi_1(n)$, $\Phi_2(n)$ and a linear operator P(n) is calculated by using the adaptive LMS with a fixed or time-varying step-size parameter or the NLMS algorithm at time n, and a noise subspace is estimated from this linear operator, then the directions of coherent signals at time n is estimated by using Newton approximation in an environment of temporally and spatially uncorrelated white additive noise.

Embodiment Using Three Arbitrary Groups

Three arbitrary groups are selected from among the four groups in (A) above, and the matrices $\Phi_1(n)$, $\Phi_2(n)$ are determined from one of the following equations $$\Phi_1(n)=[\Phi_{f1}(n),\overline{\Phi}_{f1}(n),\Phi_{b1}(n)],\ \Phi_2(n)=[\Phi_{f2}(n),\overline{\Phi}_{f2}(n),\Phi_{b2}(n)] \quad (27a)$$

$$\Phi_1(n)=[\Phi_{f1}(n),\overline{\Phi}_{f1}(n),\overline{\Phi}_{b1}(n)],\ \Phi_2(n)=[\Phi_{f2}(n),\overline{\Phi}_{f2}(n),\overline{\Phi}_{b2}(n)] \quad (27b)$$

$$\Phi_1(n)=[\Phi_{f1}(n),\Phi_{b1}(n),\overline{\Phi}_{b1}(n)],\ \Phi_2(n)=[\Phi_{f2}(n),\Phi_{b2}(n),\overline{\Phi}_{b2}(n)] \quad (27c)$$

$$\Phi_1(n)=[\overline{\Phi}_{f1}(n),\Phi_{b1}(n),\overline{\Phi}_{b1}(n)],\ \Phi_2(n)=[\overline{\Phi}_{f2}(n),\Phi_{b2}(n),\overline{\Phi}_{b2}(n)] \quad (27d)$$

Also, by using these two matrices $\Phi_1(n)$, $\Phi_2(n)$, a linear operator P(n) is calculated by using the adaptive LMS with a fixed or time-varying step-size parameter or the NLMS algorithm at time n, and a noise subspace is estimated from that linear operator, then the directions of coherent signals at time n are estimated by using Newton approximation in an environment of temporally and spatially uncorrelated white additive noise.

(C) Third Embodiment

The first and second embodiments are embodiments in which the directions of radio waves are estimated in an environment of temporally and spatially uncorrelated white additive noise, where the correlation between the noise $w_i(n)$, $w_j(n)$ included in the signals received at the i th and j th antenna elements can be expressed by the following equations $$E\{w_i(n)w_j^*(n)\}=\sigma^2\ (i=j)$$

$$E\{w_i(n)w_j^*(n)\}=0\ (i\neq j)$$

In other words, this is the case in which the length of the spatial correlation of the noise is 1. This third embodiment is an embodiment in which the length of the spatial correlation of the noise is q (>1). When the length of the spatial correlation of the noise is q, the correlation between the noise $w_i(n)$, $w_j(n)$ included in the signals received at the ith and jth antenna elements can be expressed by the following equations $$E\{w_i(n)w_j^*(n)\}\neq 0\ (|i-j|\leq q)$$

$$E\{w_i(n)w_j^*(n)\}=0\ (|i-j|>q)$$

In other words, when the length of the spatial correlation of the noise is q, the noise covariance matrix will becomes a banded Toeplitz matrix with 2q+1 non-zero diagonals, i.e., the effect of additive noise is included in the elements of major diagonal and that of the q upper (for +q) and lower (−q) diagonals off the major diagonal.

Since the array covariance matrix R is conjugate symmetrical, in order to estimate the directions, it is sufficient to only calculate the first and last columns as shown in FIG. 15, or the first and last rows as shown in FIG. 16. To avoid the infection of additive noise in direction estimation, the elements $r_{11} \sim r_{q+1,1}$, $r_{M-q,M} \sim r_{MM}$ can be removed from each column as shown in FIG. 15, and the elements $r_{11} \sim r_{1,q+1}$, $r_{M,M-q} \sim r_{MM}$ can be removed from each row as shown in FIG. 16.

The procedure performed by the direction estimation unit 50 for estimating the directions of coherent signals in an environment of spatially correlated additive noise will be explained below. The correlation calculation unit 51 calculates the instantaneous cross-correlations $$r_{1M}(n),\ r_{2M}(n),\ \ldots\ r_{M-q-1,M}(n)$$

Figure 17:
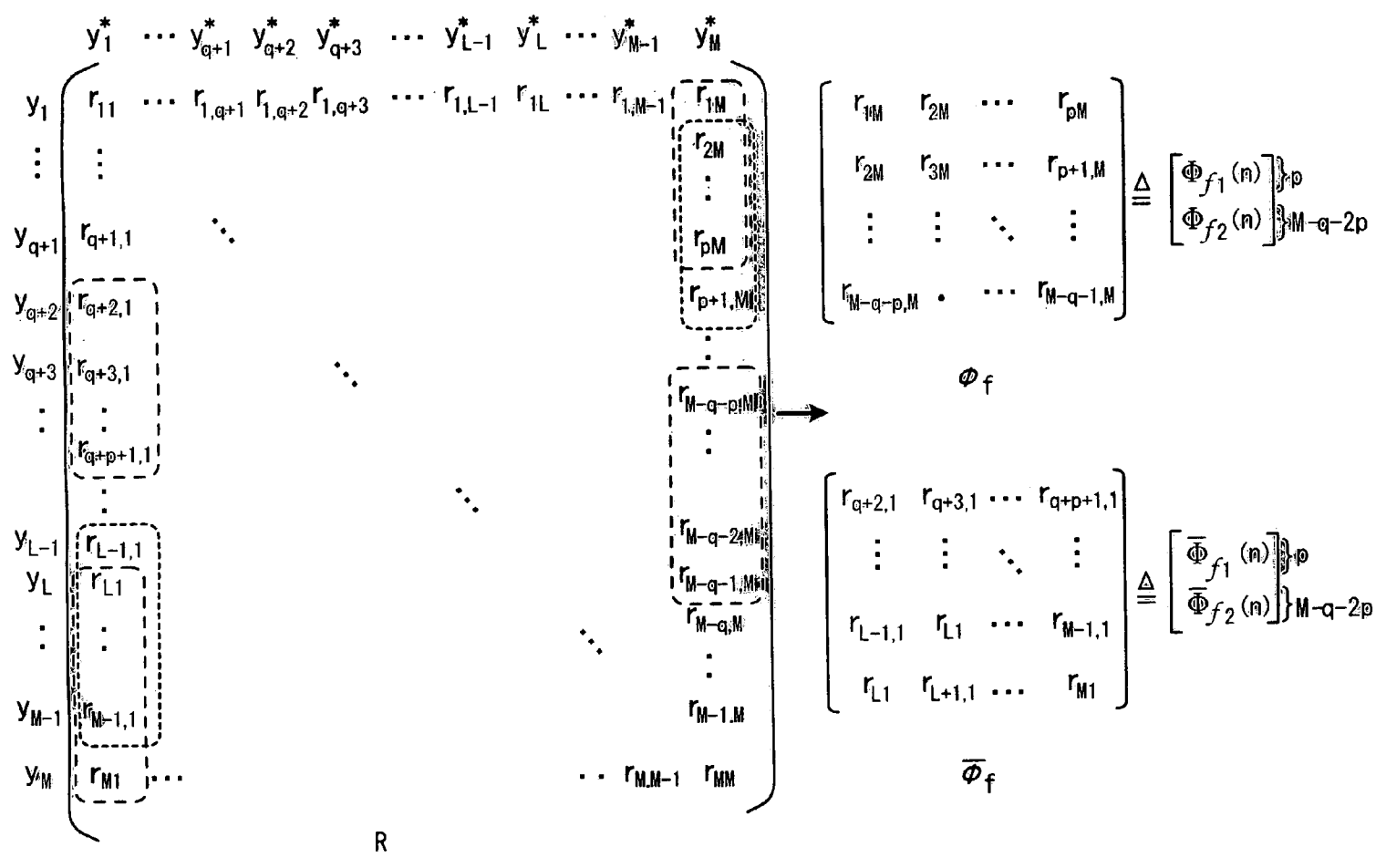

(see the last column of FIG. 15) at time n between the signal received at the Mth antenna element and the signals received at the first, second, . . . , (M−q−1)th antenna elements. Next, as shown in FIG. 17, the formation unit 52 selects (M−q−p) pairs each of which is consisted of p cross-correlations from the (M−q−1) instantaneous cross-correlations to form a (M−q−p)×p Hankel correlation matrix $\Phi_f(n)$ and divides this Hankel matrix into a p×p upper matrix $\Phi_{f1}(n)$ and a (M−q−2p)×p lower matrix $\Phi_{f2}(n)$. Similarly, the correlation calculation unit 51 calculates the instantaneous cross-correlations $$r_{q+2,1}(n),r_{q+3,1}(n),\ \ldots\ r_{M1}(n)$$

(see the first column in FIG. 15) at time n between the signal received at the first antenna element and the signals received at the (q+2)th, (q+3)th, . . . , Mth antenna elements. Next, as shown in FIG. 17, the formation unit 52 selects (M−q−p) pairs each of which is consisted of p instantaneous cross-correlations from the (M−q−1) instantaneous correlations to form a (M−q−p)×p Hankel correlation matrix $\overline{\Phi}_f(n)$ and divides this Hankel matrix into a p×p upper matrix $\overline{\Phi}_{f1}(n)$ and a (M−q−2p)×p lower matrix $\overline{\Phi}_{f2}(n)$.

Further the correlation calculation unit 51 calculates the instantaneous cross-correlations $$r_{1,q+2}(n),\ r_{1,q+3}(n),\ \ldots\ r_{1,M}(n)$$

Figure 18:
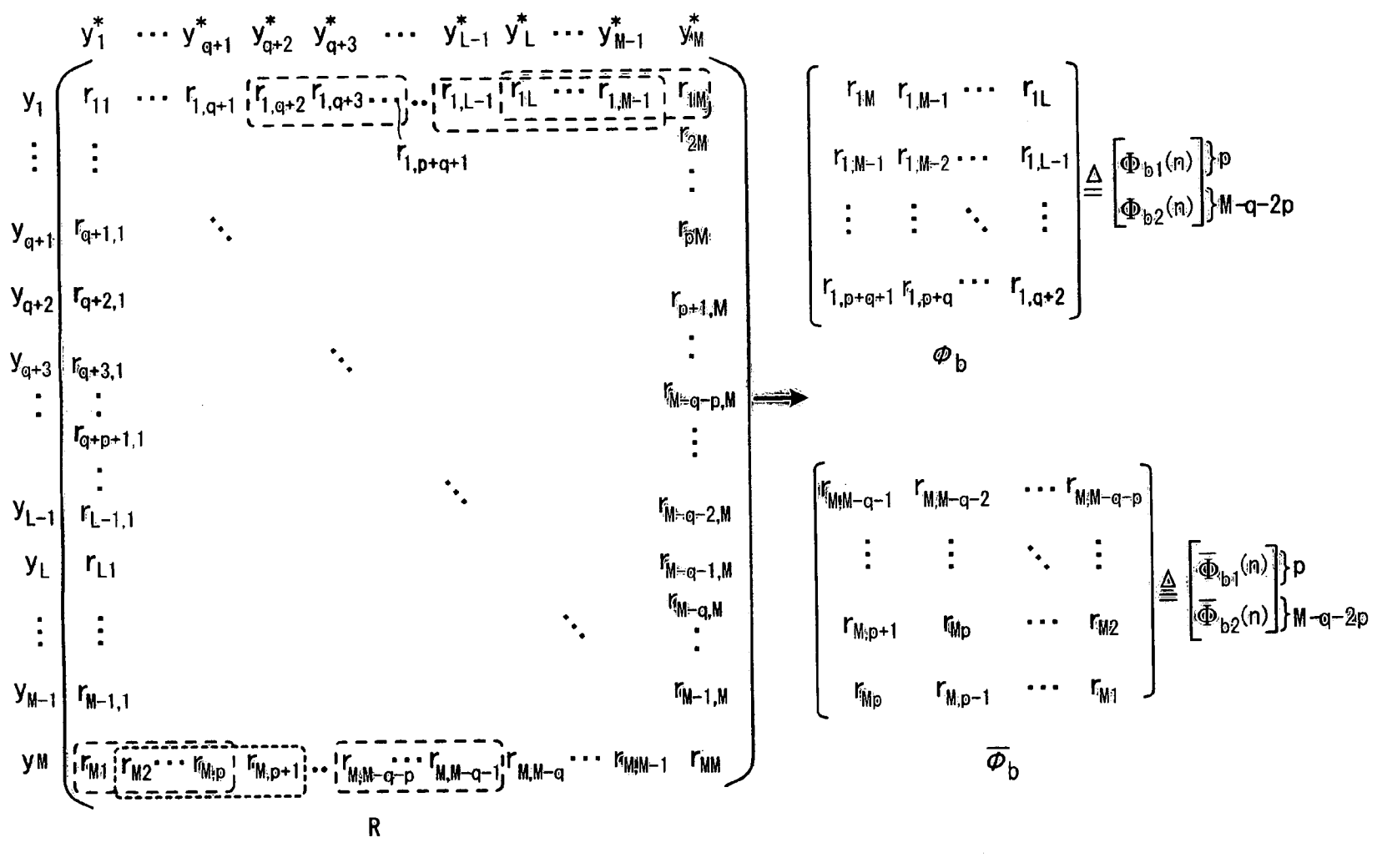

(see the first row of FIG. 16) at time n between the signal received at the first antenna element and the signals received at the (q+2)th, (q+3)th, . . . , Mth antenna elements. Next, as shown in FIG. 18, the formation unit 52 selects (M−q−p) pairs each of which is consisted of p instantaneous cross-correlations from the (M−q−1) instantaneous correlations to form a (M−q−p)×p Hankel correlation matrix $\Phi_b(n)$ and divides this Hankel matrix into a p×p upper matrix $\Phi_{b1}(n)$ and a (M−q−2p)×p lower matrix $\Phi_{b2}(n)$. Similarly, the correlation calculation unit 51 calculates the instantaneous cross-correlations $$r_{M1}(n), r_{M2}(n), \ldots r_{M,M-q-1}(n)$$

(see the last row in FIG. 16) at time n between the signal received at the Mth antenna element and the signals received at the first, second, . . . , (M−q−1)th antenna elements. Next, as shown in FIG. 18, the formation unit 52 selects (M−q−p) pairs each of which is consisted of p instantaneous cross-correlations from the (M−q−1) instantaneous correlations to form a (M−q−p)×p Hankel correlation matrix $\overline{\Phi}_b(n)$ and divides this Hankel matrix into a p×p upper matrix $\overline{\Phi}_{b1}(n)$ and a (M−q−2p)×p lower matrix $\overline{\Phi}_{b2}(n)$.

Next, the update unit 53 uses
$\Phi_{f1}(n)$, $\Phi_{f2}(n)$; $\overline{\Phi}_{f1}(n)$, $\overline{\Phi}_{f2}(n)$; $\Phi_{b1}(n)$, $\Phi_{b2}(n)$; $\overline{\Phi}_{b1}(n)$, $\overline{\Phi}_{b2}(n)$ to form the two matrices $\Phi_1(n)$ and $\Phi_2(n)$ as shown in Equation 13, and uses these matrices $\Phi_1(n)$, $\Phi_2(n)$ and the linear operator P(n−1) to calculate an estimation error matrix E(n) as shown in Equation 14. And the linear operator P(n) at time n is estimated by using adaptive LMS algorithm with fixed step-size parameter μ as shown in Equation 15. Then the projector calculation unit 54 calculates the orthogonal projection operator π(n) from the estimated linear operator P(n) as shown in Equation 19. Finally, the direction update unit 55 calculates the directions at time n by using Newton approximation as shown in Equation 21. As described above, the direction estimation unit 50 uses the LMS algorithm with a fixed step-size μ and the Newton approximation, and is able to estimate and track the directions of uncorrelated signals, partially correlated signals or coherent signals in an environment of spatially correlated additive noise.

In the description above, the linear operator P(n) is calculated by using the adaptive LMS algorithm as shown in Equation 15, where the step-size parameter μ is fixed. However, as in the first embodiment, it is possible to calculate P(n) by using the adaptive LMS algorithm with a time-varying as shown in Equations 22.

Also, as in the first embodiment, it is possible to calculate the linear operator P(n) by using the adaptive NLMS algorithm as shown in Equation 23 and Equation 24.

In the description above, four Hankel correlation matrices
$\Phi_f(n)$, $\overline{\Phi}_f(n)$, $\Phi_b(n)$, $\overline{\Phi}_b(n)$ are formed, and each matrix is divided into an upper and lower submatrices, $\Phi_{f1}(n)$, $\Phi_{f2}(n)$; $\overline{\Phi}_{f1}(n)$, $\overline{\Phi}_{f2}(n)$; $\Phi_{b1}(n)$, $\Phi_{b2}(n)$; $\overline{\Phi}_{b1}(n)$, $\overline{\Phi}_{b2}(n)$       (A)

and these matrices are used to form the matrices $\Phi_1(n)$ and $\Phi_2(n)$ as shown Equation 13, then the linear operator P(n) is obtained from these two matrices $\Phi_1(n)$, $\Phi_2(n)$, and finally the directions of the radio waves are estimated. However, as in the second embodiment, it is possible to form the matrices $\Phi_1(n)$ and $\Phi_2(n)$ by using any number of arbitrary groups, one to four, from among the four groups in (A) above.

(D) Fourth Embodiment

Receiving Apparatus of Base Station

It is possible to construct a receiving apparatus of base station comprising a direction estimation device for incident signals, and a beamforming unit that generates a receiving beam pattern whose peak points in the directions estimated by the direction estimation apparatus.

Figure 19:
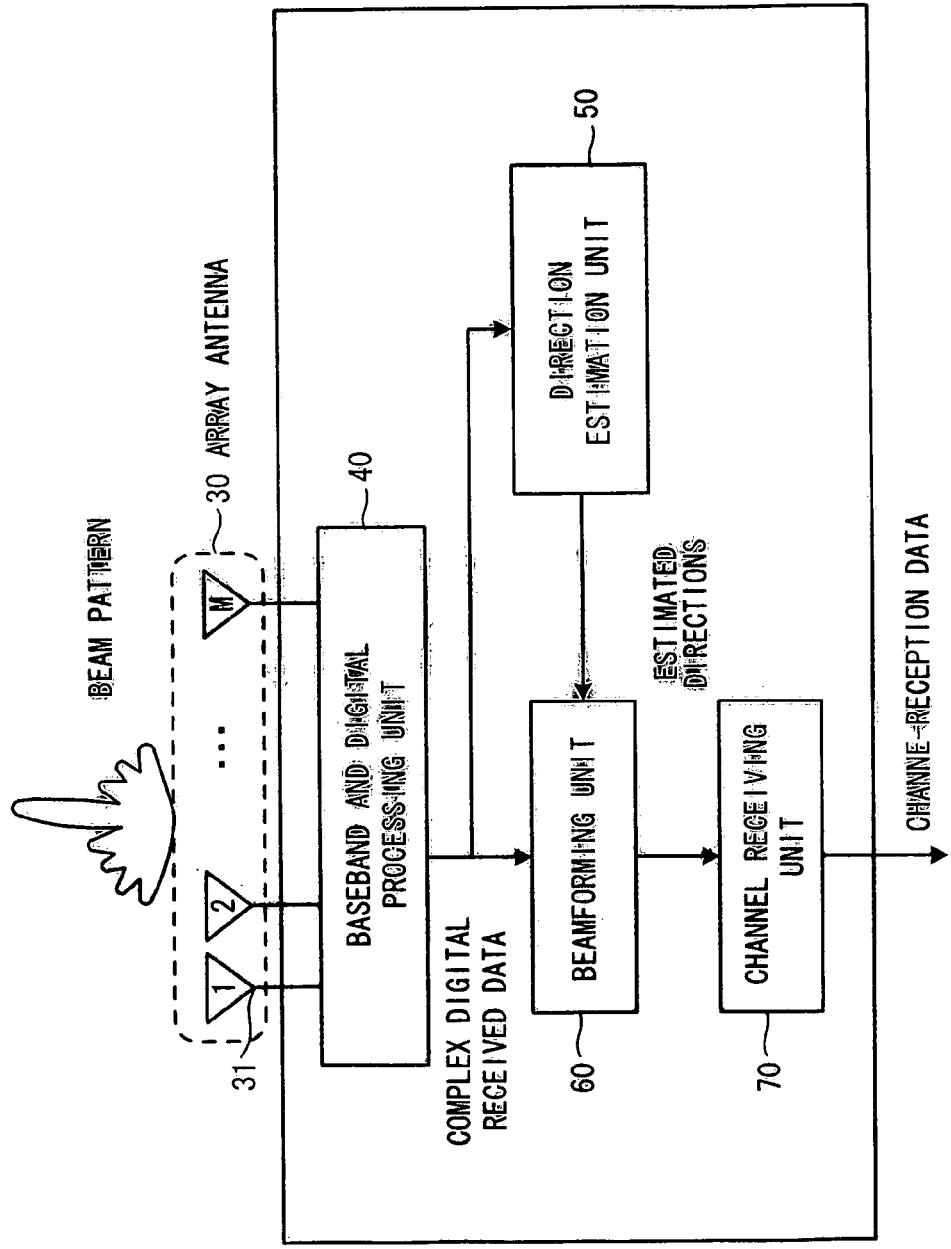
FIG. 19 is a drawing showing the construction of a base station receiving apparatus.

FIG. 19 is a drawing showing the construction of a receiving apparatus of base station. An array antenna 30 receives signals and inputs them to a baseband and digital processing unit 40. The digital processing unit 40 processes the signals for each antenna element, and outputs complex digital received data. The direction estimation unit 50 uses the complex digital received data for each antenna element to estimate the directions of the incident signals. The beamforming unit (receiving beamformer) 60 uses the estimated directions to form a beam that has a peak that points in the directions of the incident signals. In other words, the beamforming unit 60 extracts the desired signal while suppressing interference and noise, and sends it to the channel receiving unit 70. The channel receiving unit 70 performs processing by a well-known method, and modulates and outputs the received data.

Various configurations of construction are possible for the beamforming unit 60 that uses the direction information obtained in the first, second and third embodiments to form a beam that points in the directions of the incident signals, for examples, beamforming techniques that are proposed in O. L. Frost, "An algorithm for linearly constrained adaptive array processing," Proc. IEEE, vol. 60, no. 8, pp. 926-935 (1975), and J. Xin, H. Tsuji, Y. Hase and A. Sano, "Array beam forming based on cyclic signal detection," Proc. IEEE 48th Vehicular Technology Conference, pp. 890-984, Ottawa, Canada (1998) can be used.

Transmitting Apparatus of Base Station

It is possible to construct a transmitting apparatus of base station that comprises a direction estimation unit 50 for radio waves, and a beamforming unit (beamformer) 80 that generates a beam pattern having a peak that points toward the direction estimated by the direction estimation unit.

Figure 20:
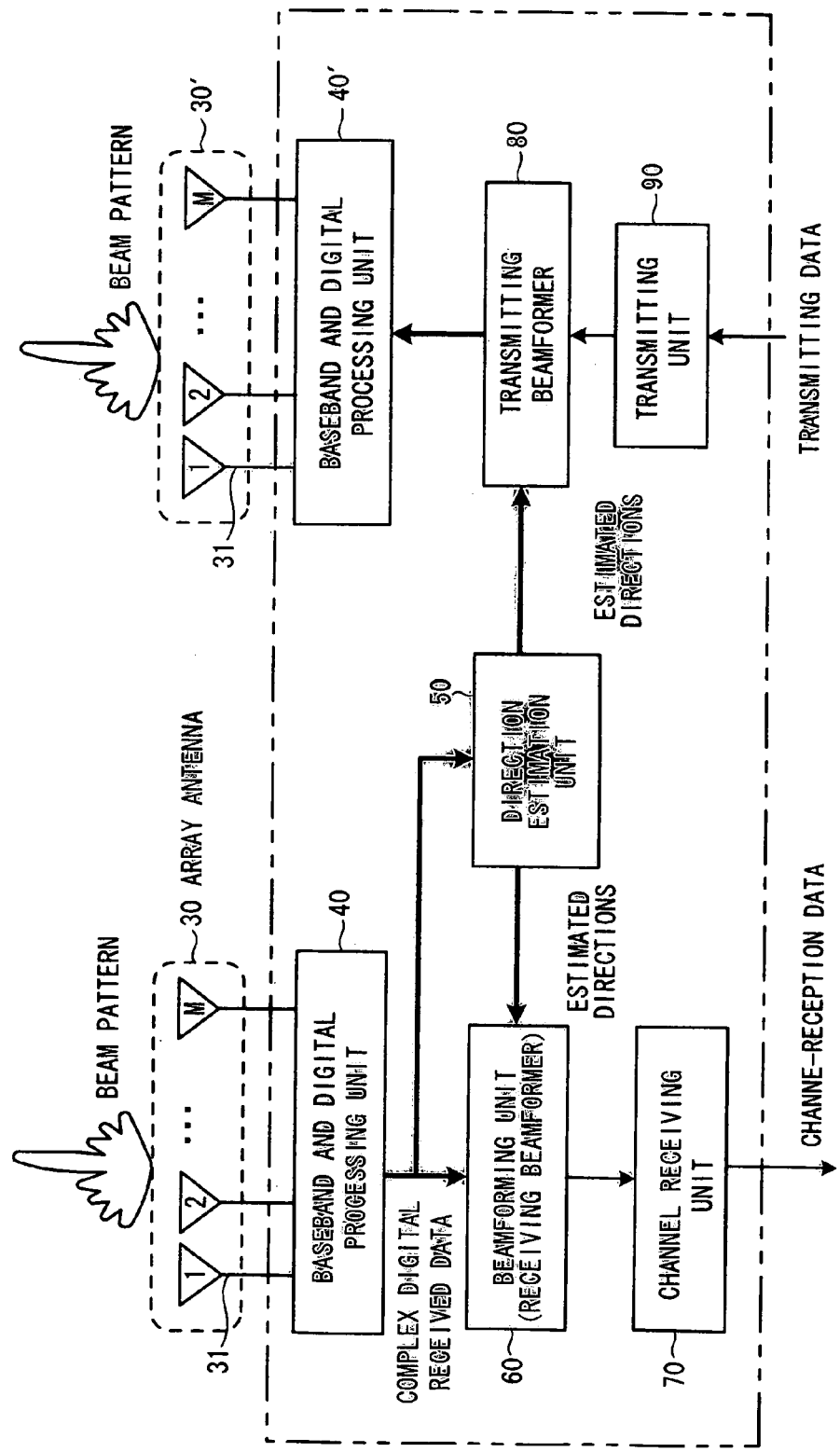
FIG. 20 is a drawing showing the construction of a transmitting apparatus of base station.

FIG. 20 is a drawing showing the construction of a transmitting apparatus of base station, where a receiving apparatus of base station is also shown in FIG. 20. The transmitting data is input from a transmitting unit 90 to a transmitting beamformer 80 that forms a transmitting beam pattern whose peak points toward the directions estimated by the direction estimation unit 50, and inputs a complex digital transmitting signal to a baseband and digital signal processing unit 40'. The signal processing unit 40' converts the complex digital transmitting data to a wireless signal, and inputs it to each antenna element of an array antenna 30'. The array antennas 30, 30' shown in FIG. 20 can be made common.

The present invention can be applied to online estimation or tracking of the directions of multiple uncorrelated signals, partially correlated signals or coherent signals.

(E) Effect of the Invention

As explained above, the present invention is capable of online estimation or tracking of the directions of multiple uncorrelated signals, partially correlated signals or coherent signals incident on an array antenna at a base station without using complicated processes such as eigendecomposition and spatial smoothing, and thus is also capable of reducing the amount of computational load.

Moreover, as verified clearly through the concrete examples of computer simulations, the method of this invention can quickly and accurately estimate the time-varying directions of signals. Therefore, it becomes possible to improve the accuracy of estimating and tracking the directions of incident signals.

Furthermore, by using the information related to the directions obtained by the direction estimation method of this invention, it is possible to construct variable direction receiving and transmitting apparatus of a base station that are capable of forming beams having directional characteristics in a desired direction.

Also, with this invention, it is possible to estimate the direction of radio waves even in an environment of spatially correlated additive noise.

What is claimed is:

1. A direction estimation method for coherent signals in an environment of temporally and spatially uncorrelated white additive noise, where a specified number (=p<M/2) of coherent signals are received by a uniform linear array with multiple (=M) antenna elements, comprising step of:

calculating M−1 instantaneous cross-correlations at time n between the signal received at one antenna element and the signals received at the other antenna elements;

selecting multiple pairs of these cross-correlations, each of which is consisted of p instantaneous cross-correlations from the calculated M−1 instantaneous correlations to form a Hankel correlation matrix and dividing this Hankel matrix into an upper and lower submatrices;

calculating a linear operator at time n from these two upper and lower submatrices by using an adaptive LMS algorithm with a fixed or time-varying step-size parameter;

estimating a noise subspace by using this estimated linear operator; and estimating the directions of the coherent signals at time n from the estimated noise subspace by using Newton approximation.

2. A direction estimation method for coherent signals in an environment of temporally and spatially uncorrelated white additive noise, where a specified number (=p<M/2) of coherent signals are received by a uniform linear array with multiple (=M) antenna elements, comprising step of:

calculating (M−1) instantaneous cross-correlations $r_{1M}(n)$, $r_{2M}(n)$, . . . $r_{M-1,M}(n)$ at time n between the signal received at the Mth antenna element and the signals received at the first, second, . . . , (M−1) th antenna elements; forming a (M−p)×p Hankel correlation matrix $\Phi_f(n)$, which is formed by selecting (M−p) pairs each of which is consisted of p instantaneous correlations from the (M−1) instantaneous cross-correlations and dividing this Hankel matrix into a p×p upper matrix $\Phi_{f1}(n)$ and a (M−2p)×p lower matrix $\Phi_{f2}(n)$;

moreover, calculating (M−1) instantaneous cross-correlations $r_{21}(n)$, $r_{31}(n)$, . . . $r_{M1}(n)$ at time n between the signal received at the first antenna element and the signals received at the second, third, . . . , Mth antenna elements; forming a (M−p)×p Hankel correlation matrix $\overline{\Phi}_f(n)$, which is formed by selecting (M−p) pairs each of which is consisted of p instantaneous correlations from the (M−1) instantaneous cross-correlations and dividing this Hankel matrix into a p×p upper matrix $\overline{\Phi}_{f1}(n)$ and a (M−2p)×p lower matrix $\overline{\Phi}_{f2}(n)$;

furthermore, calculating (M−1) instantaneous cross-correlations $r_{12}(n)$, $r_{13}(n)$, . . . $r_{1M}(n)$ at time n between the signal received at the first antenna element and the signals received at the second, third, . . . , Mth antenna elements; forming a (M−p)×p Hankel correlation matrix $\Phi_b(n)$, which is formed by selecting (M−p) pairs each of which is consisted of p instantaneous correlations from the (M−1) instantaneous cross-correlations and dividing this Hankel matrix into a p×p upper matrix $\Phi_{b1}(n)$ and a (M−2p)×p lower matrix $\Phi_{b2}(n)$;

moreover, by calculating (M−1) instantaneous cross-correlations $r_{M1}(n)$, $r_{M2}(n)$, . . . $r_{M,M-1}(n)$ at time n between the signal received at the Mth antenna element and the signals received at the first, second, . . . , (M−1)th antenna elements; calculating a (M−p)×p Hankel correlation matrix $\overline{\Phi}_b(n)$, which is formed by selecting (M−p) pairs each of which is consisted of p instantaneous correlations from the (M−1) instantaneous cross-correlations and dividing this Hankel correlation matrix into a p×p upper matrix $\overline{\Phi}_{b1}(n)$ and a (M−2p)×p lower matrix $\overline{\Phi}_{b2}(n)$;

selecting one group from the four groups of instantaneous cross-correlation matrices $\Phi_{f1}(n)$, $\Phi_{f2}(n)$; $\overline{\Phi}_{f1}(n)$, $\overline{\Phi}_{f2}(n)$; $\Phi_{b1}(n)$, $\Phi_{b2}(n)$; $\overline{\Phi}_{b1}(n)$, $\overline{\Phi}_{b2}(n)$ and forming the matrices $\Phi_1(n)$, $\Phi_2(n)$ as $\Phi_1(n)=\Phi_{f1}(n)$, $\Phi_2(n)=\Phi_{f2}(n)$ or $\Phi_1(n)=\overline{\Phi}_{f1}(n)$, $\Phi_2(n)=\overline{\Phi}_{f2}(n)$, or $\Phi_1(n)=\Phi_{b1}(n)$, $\Phi_2(n)=\Phi_{b2}(n)$ or $\Phi_1(n)=\overline{\Phi}_{b1}(n)$, $\Phi_2(n)=\overline{\Phi}_{b2}(n)$;

calculating a linear operator at time n from these two matrices $\Phi_1(n)$, $\Phi_2(n)$, by using an adaptive LMS algorithm with a fixed or time-varying step-size parameter, and estimating a noise subspace by using this linear operator; and estimating the direction of coherent signals from the noise subspace at time n by using Newton approximation.

3. A direction estimation method for coherent signals in an environment of temporally and spatially uncorrelated white additive noise, where a specified number (=p<M/2) of coherent signals are received by a uniform linear array with multiple (=M) antenna elements, comprising step of:

calculating (M−1) instantaneous cross-correlations $r_{1M}(n)$, $r_{2M}(n)$, . . . $r_{M-1,M}(n)$ at time n between the signal received at the Mth antenna element and the signals received at the first, second, . . . , (M−1) th antenna elements; forming a (M−p)×p Hankel correlation matrix $\Phi_f(n)$, which is formed by selecting (M−p) pairs each of which is consisted of p instantaneous correlations from the (M−1) instantaneous cross-correlations and dividing this Hankel matrix into a p×p upper matrix $\Phi_{f1}(n)$ and a (M−2p)×p lower matrix $\Phi_{f2}(n)$;

moreover, calculating (M−1) instantaneous cross-correlations $r_{21}(n)$, $r_{31}(n)$, . . . $r_{M1}(n)$ at time n between the signal received at the first antenna element and the signals received at the second, third, . . . , Mth antenna elements; forming a (M−p)×p Hankel correlation matrix $\overline{\Phi}_f(n)$, which is formed by selecting (M−p) pairs each of which is consisted of p instantaneous correlations from the (M−1) instantaneous cross-correlations and dividing this Hankel matrix into a p×p upper matrix $\overline{\Phi}_{f1}(n)$ and a (M−2p)×p lower matrix $\overline{\Phi}_{f2}(n)$;

furthermore, calculating (M−1) instantaneous cross-correlations $r_{12}(n)$, $r_{13}(n)$, . . . $r_{1M}(n)$ at time n between the signal received at the first antenna element and the signals received at the second, third, . . . , Mth antenna elements; forming a (M−p)×p Hankel correlation matrix $\Phi_b(n)$, which is formed by selecting (M−p) pairs each of which is consisted of p instantaneous correlations from the (M−1) instantaneous cross-correlations and dividing this Hankel matrix into a p×p upper matrix $\Phi_{b1}(n)$ and a (M−2p)×p lower matrix $\Phi_{b2}(n)$;

moreover, by calculating (M−1) instantaneous cross-correlations $r_{M1}(n)$, $r_{M2}(n)$, $r_{M,M-1}(n)$ at time n between the signal received at the Mth antenna element and the signals received at the first, second, . . . , (M−1)th antenna elements; calculating a (M−p)×p Hankel correlation matrix $\overline{\Phi}_b(n)$, which is formed by selecting (M−p) pairs each of which is consisted of p instantaneous correlations from the (M−1) instantaneous cross-correlations and dividing this Hankel correlation matrix into a p×p upper matrix $\overline{\Phi}_{b1}(n)$ and a (M−2p)×p lower matrix $\overline{\Phi}_{b2}(n)$;

selecting one group from the four groups of instantaneous cross-correlation matrices $\Phi_{f1}(n)$, $\Phi_{f2}(n)$; $\overline{\Phi}_{f1}(n)$, $\overline{\Phi}_{f2}(n)$; $\Phi_{b1}(n)$, $\Phi_{b2}(n)$; $\overline{\Phi}_{b1}(n)$, $\overline{\Phi}_{b2}(n)$ and forming the matrices $\Phi_1(n)$, $\Phi_2(n)$ as $\Phi_1(n) [\Phi f_1(n), \overline{\Phi}_{f1}(n)]$, $\Phi_2(n)=[\Phi_{f2}(n), \overline{\Phi}_{f2}(n)]$ or
$\Phi_1(n)=[\Phi_{f1}(n), \Phi_{b1}(n)]$, $\Phi_2(n)=[\Phi_{f2}(n), \Phi_{b2}(n)]$ or
$\Phi_1(n)=[\Phi_{f1}(n), \overline{\Phi}_{b1}(n)]$, $\Phi_2(n)=[\Phi_{f2}(n), \overline{\Phi}_{b2}(n)]$ or
$\Phi_1(n)=[\overline{\Phi}_{f1}(n), \Phi_{b1}(n)]$, $\Phi_2(n)=[\overline{\Phi}_{f2}(n), \Phi_{b2}(n)]$ or
$\Phi_1(n)=[\overline{\Phi}_{f1}(n), \overline{\Phi}_{b1}(n)]$, $\Phi_2(n)=[\overline{\Phi}_{f2}(n), \overline{\Phi}_{b2}(n)]$ or
$\Phi_1(n)=[\Phi_{b1}(n), \overline{\Phi}_{b1}(n)]$, $\Phi_2(n)=[\Phi_{b2}(n), \overline{\Phi}_{b2}(n)]$ calculating a linear operator at time n from these two matrices $\Phi_1(n)$, $\Phi_2(n)$ by using an adaptive LMS algorithm with a fixed or time-varying step-size parameter;

estimating a noise subspace by using that linear operator; and estimating the direction of coherent signals from the noise subspace at time n by using Newton approximation.

4. A direction estimation method for coherent signals in an environment of temporally and spatially uncorrelated white acditive noise, where a specified number (=p<M/2) of coherent signals are received by a uniform linear array with multiple (=M) antenna elements, comprising step of:

calculating (M−1) instantaneous cross-correlations $r_{1M}(n)$, $r_{2M}(n)$, ... $r_{M-1,M}(n)$ at time n between the signal received at the Mth antenna element and the signals received at the first, second, ... , (M−1)th antenna elements; forming a (M−p)×p Hankel correlation matrix $\Phi_f(n)$, which is formed by selecting (M−p) pairs each of which is consisted of p instantaneous correlations from the (M−1) instantaneous cross-correlations and dividing this Hankel matrix into a p×p upper matrix $\Phi_{f1}(n)$ and a (M−2p)×p lower matrix $\Phi_{f2}(n)$;

moreover, calculating (M−1) instantaneous cross-correlations $r_{21}(n)$, $r_{31}(n)$, ... $r_{M1}(n)$ at time n between the signal received at the first antenna element and the signals received at the second, third, ... , Mth antenna elements; forming a (M−p)×p Hankel correlation matrix $\overline{\Phi}_f(n)$, which is formed by selecting (M−p) pairs each of which is consisted of p instantaneous correlations from the (M−1) instantaneous cross-correlations and dividing this Hankel matrix into a p×p upper matrix $\overline{\Phi}_{f1}(n)$ and a (M−2p)×p lower matrix $\overline{\Phi}_{f2}(n)$;

furthermore, calculating (M−1) instantaneous cross-correlations $r_{12}(n)$, $r_{13}(n)$, ... $r_{1,M}(n)$ at time n between the signal received at the first antenna element and the signals received at the second, third, ... , Mth antenna elements; forming a (M−p)×p Hankel correlation matrix $\Phi_b(n)$, which is formed by selecting (M−p) pairs each of which is consisted of p instantaneous correlations from the (M−1) instantaneous cross-correlations and dividing this Hankel matrix into a p×p upper matrix $\Phi_{b1}(n)$ and a (M−2p)×p lower matrix $\Phi_{b2}(n)$;

moreover, by calculating (M−1) instantaneous cross-correlations $r_{M1}(n)$, $r_{M2}(n)$, $r_{M,M-1}(n)$ at time n between the signal received at the Mth antenna element and the signals received at the first, second, ... , (M−1)th antenna elements; calculating a (M−p)×p Hankel correlation matrix $\overline{\Phi}_b(n)$, which is formed by selecting (M−p) pairs each of which is consisted of p instantaneous correlations from the (M−1) instantaneous cross-correlations and dividing this Hankel correlation matrix into a p×p upper matrix $\overline{\Phi}_{b1}(n)$ and a (M−2p)×p lower matrix $\overline{\Phi}_{b2}(n)$;

selecting one group from the four groups of instantaneous cross-correlation matrices $\Phi_{f1}(n)$, $\Phi_{f2}(n)$; $\overline{\Phi}_{f1}(n)$, $\overline{\Phi}_{f2}(n)$; $\Phi_{b1}(n)$, $\Phi_{b2}(n)$; $\overline{\Phi}_{b1}(n)$, $\overline{\Phi}_{b2}(n)$ and forming the matrices $\Phi_1(n)$, $\Phi_2(n)$, as $\Phi_1(n)=[\Phi_{f1}(n), \overline{\Phi}_{f1}(n), \Phi_{b1}(n)]$, $\Phi_2(n)=[\Phi_{f2}(n), \overline{\Phi}_{f2}(n), \Phi_{b2}(n)]$ or
$\Phi_1(n)=[\Phi_{f1}(n), \overline{\Phi}_{f1}(n), \Phi_{b1}(n)]$, $\Phi_2(n)=[\Phi_{f2}(n), \overline{\Phi}_{f2}(n), \overline{\Phi}_{b2}]$ or
$\Phi_1(n)=[\Phi_{f1}(n), \Phi_{b1}(n), \overline{\Phi}_{b1}(n)]$, $\Phi_2(n)=[\Phi_{f2}(n), \Phi_{b2}(n), \overline{\Phi}_{b2}(n)]$ or
$\Phi_1(n)=[\overline{\Phi}_{f1}(n), \Phi_{b1}(n), \overline{\Phi}_{b1}(n)]$, $\Phi_2(n)=[\overline{\Phi}_{f2}(n), \Phi_{b2}(n), \overline{\Phi}_{b2}(n)]$ or calculating a linear operator at time n from these two matrices $\Phi_1(n)$, $\Phi_2(n)$, by using an adaptive LMS algorithm with a fixed or time-varying step-size parameter;

estimating a noise subspace by using this linear operator; and estimating the direction of coherent signals from the noise subspace at time n by using Newton approximation.

5. A direction estimation method for coherent signals in an environment of temporally and spatially uncorrelated white additive noise, where a specified number (=p<M/2) of coherent signals are received by a uniform linear array with multiple (=M) antenna elements, comprising step of:

calculating (M−1) instantaneous cross-correlations $r_{1M}(n)$, $r_{2M}(n)$, ... $r_{M-1,M}(n)$ at time n between the signal received at the Mth antenna element and the signals received at the first, second, ... , (M−1) th antenna elements; forming a (M−p)×p Hankel correlation matrix $\Phi_f(n)$, which is formed by selecting (M−p) pairs each of which is consisted of p instantaneous correlations from the (M−1) instantaneous cross-correlations and dividing this Hankel matrix into a p×p upper matrix $\Phi_{f1}(n)$ and a (M−2p)×p lower matrix $\Phi_{f2}(n)$;

moreover, calculating (M−1) instantaneous cross-correlations $r_{21}(n)$, $r_{31}(n)$, ... $r_{M1}(n)$ at time n between the signal received at the first antenna element and the signals received at the second, third, ... , Mth antenna elements; forming a (M−p)×p Hankel correlation matrix $\overline{\Phi}_f(n)$, which is formed by selecting (M−p) pairs each of which is consisted of p instantaneous correlations from the (M−1) instantaneous cross-correlations and dividing this Hankel matrix into a p×p upper matrix $\overline{\Phi}f_1(n)$ and a (M−2p)×p lower matrix $\overline{\Phi}_{f2}(n)$;

furthermore, calculating (M−1) instantaneous cross-correlations $r_{12}(n)$, $r_{13}(n)$, ... $r_{1,M}(n)$ at time n between the signal received at the first antenna element and the signals received at the second, third, ... , Mth antenna elements; forming a (M−p)×p Hankel correlation matrix $\Phi_b(n)$, which is formed by selecting (M−p) pairs each of which is consisted of p instantaneous correlations from the (M−1) instantaneous cross-correlations and dividing this Hankel matrix into a p×p upper matrix $\Phi_{b1}(n)$ and a (M−2p)×p lower matrix $\Phi_{b2}(n)$;

moreover, by calculating (M−1) instantaneous cross-correlations $r_{M1}(n)$, $r_{M2}(n)$, $r_{M,M-1}(n)$ at time n between the signal received at the Mth antenna element and the signals received at the first, second, ... , (M−1)th antenna elements; calculating a (M−p)×p Hankel correlation matrix $\overline{\Phi}_b(n)$, which is formed by selecting (M−p) pairs each of which is consisted of p instantaneous correlations from the (M−1) instantaneous cross-correlations and dividing this Hankel correlation matrix into a p×p upper matrix $\overline{\Phi}_{b1}(n)$ and a (M−2p)×p lower matrix $\overline{\Phi}_{b2}(n)$;

and forming the matrices $\Phi_1(n)$ $\Phi_2(n)$ $\Phi_1(n)=[\Phi_{f1}(n), \overline{\Phi}_{f1}(n), \Phi_{b1}(n), \overline{\Phi}_{b1}(n)]$, $\Phi_2(n)=[\Phi_{f2}(n), \overline{\Phi}_{f2}(n), \Phi_{b2}(n), \overline{\Phi}_{b2}(n)]$;

calculating a linear operator at time n from these two matrices $\Phi_1(n)$, $\Phi_2(n)$, by using an adaptive LMS algorithm with a fixed or time-varying step-size parameter;

estimating a noise subspace by using this linear operator; and estimating the direction of coherent signals from the noise subspace at time n by using Newton approximation.

6. A direction estimation method for coherent signals in an environment of temporally and spatially uncorrelated white additive noise according to claim 1, wherein the direction estimation of radio waves is performed by using an adaptive NLMS algorithm to obtain the noise subspace and using Newton approximation to update the estimated directions of incident signals.

7. A direction estimation method for uncorrelated signals in an environment of temporally and spatially uncorrelated white additive noise, or in an environment of spatially correlated additive noise according to claim 1, wherein the direction estimation of radio waves is performed by using an adaptive LMS algorithm with a fixed or time-varying step-size parameter or using an adaptive NLMS algorithm to obtain the noise subspace and by using Newton approximation to update the estimated directions of incident signals.

8. A direction estimation method for correlated signals in an environment of temporally and spatially uncorrelated white additive noise, or in an environment of spatially correlated additive noise according to claim 1, wherein the direction estimation of radio waves is performed by using an adaptive LMS algorithm with a fixed or time-varying step-size parameter or using an adaptive NLMS algorithm to obtain the noise subspace and by using Newton approximation to update the estimated directions of incident signals.

9. A direction estimation apparatus for the coherent, correlated or uncorrelated signals in an environment of temporally and spatially uncorrelated white additive noise, where a specified number (=p<M/2) of incident signals are received by a uniform linear array with multiple (=M) antenna elements, and comprising:

means for calculating M−1 instantaneous cross-correlations at time n between the signal received at each antenna element and the signals received at the other antenna elements;

means for selecting multiple pairs of the cross-correlations, each of which is consisted of p instantaneous cross-correlations from the calculated M−1 instantaneous correlations to form a Hankel correlation matrix and dividing this matrix into an upper and lower correlation matrices;

means calculating a linear operator at time n from these two upper and lower correlation matrices by using an adaptive LMS algorithm with a fixed or time-varying step-size parameter or using an adaptive NLMS algorithm, and estimating a noise subspace by using this estimated linear operator;

means for estimating a noise subspace by using this estimated linear operator; and means for estimating the directions of the coherent signals at time n from the estimated u noise subspace by using Newton approximation.

10. A receiving beamforming apparatus at a base station that employs the direction estimation method of claim 1 in an environment of temporally and spatially uncorrelated white additive noise, comprising:

means for instantaneous cross-correlations at time n between the signal received at each antenna element and the signals received at the other antenna elements;

means selecting multiple pairs of the cross-correlations, each of which is consisted of p instantaneous cross-correlations from the calculated M−1 instantaneous correlations to form a Hankel correlation matrix and dividing this matrix into an upper and lower correlation matrices;

means for dividing the Hankel correlation matrix into two upper and lower correlation matrices;

means for calculating a linear operator at time n from these two upper and lower correlation matrices by using an adaptive LMS algorithm with a fixed or time-varying step-size parameter or using adaptive NLMS algorithm;

means for estimating a noise subspace using that linear operator;

means for estimating the direction of the incident signals at time n using the noise subspace by Newton approximation; and means for forming a beam whose peak points in the directions of incident signals.

11. A receiving apparatus of base station claim 10 comprising:

a direction estimation apparatus; and a receiving beamforming apparatus that forms a beam whose peak points in the directions estimated by said direction estimation apparatus.

12. The transmitting apparatus of base station of claim 10 comprising:

a direction estimation device; and a receiving beamforming apparatus for forming a beam whose peak points in the directions estimated by the direction estimation apparatus.

* * * * *